United States Patent
Gholmieh et al.

(10) Patent No.: US 8,625,601 B2
(45) Date of Patent: Jan. 7, 2014

(54) METHOD AND APPARATUS FOR LOW-OVERHEAD PACKET DATA TRANSMISSION AND CONTROL OF RECEPTION MODE

(75) Inventors: Aziz Gholmieh, San Diego, CA (US); Bharat Ahuja, Longmont, CO (US); Etienne F. Chaponniere, Rome (IT); Juan Montojo, San Diego, CA (US); Stein A. Lundby, Solana Beach, CA (US); Vinay Chande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1465 days.

(21) Appl. No.: 11/840,801

(22) Filed: Aug. 17, 2007

(65) Prior Publication Data

US 2008/0056229 A1 Mar. 6, 2008

Related U.S. Application Data

(63) Continuation-in-part of application No. 11/553,446, filed on Oct. 26, 2006.

(60) Provisional application No. 60/838,586, filed on Aug. 17, 2006, provisional application No. 60/732,418, filed on Oct. 31, 2005.

(51) Int. Cl.
*H04L 12/28* (2006.01)
*H04L 12/56* (2011.01)

(52) U.S. Cl.
CPC .................................. *H04L 47/10* (2013.01)
USPC ...................................................... 370/394

(58) Field of Classification Search
CPC ..................................................... H04L 47/10
USPC ................ 370/252, 349, 394, 465, 469, 473, 370/496–497
See application file for complete search history.

(56) References Cited

U.S. PATENT DOCUMENTS

| | | | |
|---|---|---|---|
| 5,883,885 | A | 3/1999 | Raith |
| 6,002,942 | A | 12/1999 | Park |

(Continued)

FOREIGN PATENT DOCUMENTS

| | | |
|---|---|---|
| CN | 1476267 A | 2/2004 |
| EP | 1339188 | 8/2003 |

(Continued)

OTHER PUBLICATIONS

3GPP TS 25.212 v7.1.0; "3rd Generation Partnership Project; Technial Specification Group Radio Access Network; Multiplexing and channel coding (FDD)," 3GPP TS 25.212 version 7.1.0. Release 7 (Jun. 2006).

(Continued)

*Primary Examiner* — Phuongchau B Nguyen
(74) *Attorney, Agent, or Firm* — Darren M. Simon

(57) ABSTRACT

A method for wireless communications where a control packet is not transmitted for all transmissions of a new data packet. A control packet is only sent with a retransmission of a data packet where the previously transmitted data packet is not completely received. The control packet contains information related to a previously transmitted data packet. The previously transmitted data packet and the retransmission data packet are derived from common data. The common data is derived based on the information related to the previously transmitted data packet, wherein the previously transmitted data packet and the retransmission data packet are associated with a series of data packets.

59 Claims, 13 Drawing Sheets

(56) References Cited

U.S. PATENT DOCUMENTS

| | | | |
|---|---|---|---|
| 6,064,662 A | 5/2000 | Gitlin et al. | |
| 6,195,680 B1 | 2/2001 | Goldszmidt et al. | |
| 6,621,796 B1* | 9/2003 | Miklos | 370/236 |
| 6,904,100 B1 | 6/2005 | Romaniuk | |
| 6,904,110 B2 | 6/2005 | Trans et al. | |
| 7,400,607 B2 | 7/2008 | Kim et al. | |
| 7,493,404 B2 | 2/2009 | Weber | |
| 7,808,955 B2* | 10/2010 | Dottling et al. | 370/336 |
| 8,489,128 B2 | 7/2013 | Lundby | |
| 2002/0057687 A1* | 5/2002 | Birkenmaier et al. | 370/389 |
| 2002/0071407 A1* | 6/2002 | Koo et al. | 370/335 |
| 2002/0093937 A1 | 7/2002 | Kim et al. | |
| 2003/0026274 A1 | 2/2003 | Droz | |
| 2003/0035403 A1 | 2/2003 | Choi et al. | |
| 2003/0108013 A1* | 6/2003 | Hwang et al. | 370/335 |
| 2003/0123470 A1* | 7/2003 | Kim et al. | 370/437 |
| 2003/0174675 A1 | 9/2003 | Willenegger et al. | |
| 2003/0192003 A1 | 10/2003 | Das et al. | |
| 2004/0037224 A1* | 2/2004 | Choi et al. | 370/235 |
| 2004/0192308 A1* | 9/2004 | Lee et al. | 455/436 |
| 2004/0202147 A1* | 10/2004 | Hakkinen et al. | 370/351 |
| 2005/0022098 A1 | 1/2005 | Vayanos et al. | |
| 2005/0031050 A1* | 2/2005 | Kim et al. | 375/267 |
| 2005/0047393 A1 | 3/2005 | Liu | |
| 2005/0068963 A1 | 3/2005 | Lee et al. | |
| 2005/0074010 A1* | 4/2005 | Kim et al. | 370/394 |
| 2005/0157876 A1 | 7/2005 | Jeong et al. | |
| 2005/0163076 A1 | 7/2005 | Vannithamby et al. | |
| 2005/0169205 A1 | 8/2005 | Grilli et al. | |
| 2005/0276249 A1* | 12/2005 | Damnjanovic et al. | 370/335 |
| 2006/0034240 A1* | 2/2006 | Kwak et al. | 370/342 |
| 2006/0104242 A1* | 5/2006 | Kim et al. | 370/329 |
| 2006/0121920 A1 | 6/2006 | Lundby | |
| 2006/0195576 A1* | 8/2006 | Rinne et al. | 709/226 |
| 2007/0036067 A1* | 2/2007 | Zhang et al. | 370/208 |
| 2007/0177569 A1 | 8/2007 | Lundby | |
| 2007/0275728 A1 | 11/2007 | Lohr et al. | |
| 2008/0123585 A1 | 5/2008 | Granzow et al. | |

FOREIGN PATENT DOCUMENTS

| | | |
|---|---|---|
| EP | 1475973 A1 | 11/2004 |
| GB | 2395404 | 5/2004 |
| JP | 2002536873 T | 10/2002 |
| KR | 1020040027965 | 4/2004 |
| KR | 020060049184 | 5/2006 |
| RU | 2196392 C2 | 1/2003 |
| WO | WO9735449 A2 | 9/1997 |
| WO | 0045543 | 8/2000 |
| WO | 0045544 | 8/2000 |
| WO | 03003617 | 1/2003 |
| WO | WO03019795 A2 | 3/2003 |
| WO | 2005041469 | 5/2005 |
| WO | WO2005125109 | 12/2005 |

OTHER PUBLICATIONS

Das, et al.: "Adaptive, Asynchronous Incremental Redundancy (A<2>IR) with Fixed Transmission Time Intervals (TTI) for HSDPA", PIMRC 2002, 13th IEEE International Symposium, pp. 1083-1087, Sep. 15-18, 2002.

Lee, et al.: "TFC Selection for MAC Scheduling in WCDMA," Vehicular Technology Conference, IEEE, pp. 2328-2332, XP010702199, Oct. 6, 2003.

Lucent Technologies, "Asynchronous and Adaptive Incremental Redundancy (A2IR) Proposal for HSDPA," TSG-RAN#17(00)1382, Nov. 25, 2000, XP002190696.

Nanda. et al.: "Adaptation Techniques in Wireless Packet Data Services," IEEE Communications Magazine, IEEE Service Center, Piscataway, US, vol. 38, No. 1, pp. 54-64, XP011091213 (Jan. 2000).

QUALCOMM CDMA Technologies, "HSDPA for Improved Downlink Data Transfer," Oct. 2004, pp. 1-17, QUALCOMM Incorporated, San Diego, CA, USA, XP002427235.

QUALCOMM Europe. "HS-SCCH-less HS-PDSCH Operation for Improved Support of IMS Real-Time Services," R1-051511, 3GPP TSG-RAN WG1 #43, Nov. 11, 2005, XP002467442.

QUALCOMM Europe, "Reduced Complexity HS-SCCH-less Operation R1-062025," 3GPP TSG-RAN WG1 #46, Sep. 1, 2006, XP002467441.

International Search Report, PCT/US07/076237, International Search Authority, European Patent Office, Feb. 26, 2008.

Written Opinion, PCT/US07/076237, International Search Authority, European Patent Office, Feb. 26, 2008.

Sjoberg, et al.: "Real-Time Transport Protocol (RTP_Payload Format and File Storage Format for the Adaptive Multi-Rate (AMR) and Adaptive Multi-Rate Wideband (AMR-WB) Audio Codecs," Network Working Group RFC 3267, Jun. 2002.

3GPP TR 25.848 v4.0.0; "3rd Generation Partnership Project; Technical Specification Group Radio Access Network; Physical layer aspects of UTRA High Speed Downlink Packet Access," 3GPP TR 25.848 version 4.0.0 Release 4, Mar. 2001.

3GPP TSG-RAN Meeting#27 RP-050106; "Support of RT Services over HSDPA-HSDPA Mobility Enhancement," Source: Cingular Wireless, Tokyo, Japan, Mar. 9-11, 2005.

3GPP TSG-RAN Meeting#27 RP-050107; "HSDPA Mobility Enhancement Solution to Support Real-Time Delay Sensitive Services," Source: Cingular Wireless, Lucent Technologies, Tokyo, Japan, Mar. 9-11, 2005.

3GPP TSG-RAN WG1 Meeting#42 R1-050754; "Uplink DPCCH Gating," Source: Nokia, London, UK, Aug. 29-Sep. 2, 2005.

3GPP TSG-RAN WG1 #42 R1-050939; "E-DPCCH Enhancement for VoIP," Source: Lucent Technologies, London, UK, Aug. 29-Sep. 2, 2005.

3GPP TSG-RAN WG1 #42bis R1-051125; "Framework for Enhanced Continuous PS Connectivity," Source: QUALCOMM Europe, San Diego, CA, USA, Oct. 10-14, 2005.

3GPP2 C.S0001-D, "Introduction to cdma2000 Spread Spectrum Systems," IS 2000 version 1.0 Revision D, Feb. 2004 (1 of 6).

3GPP2 C.S0001-D, "Introduction to cdma2000 Spread Spectrum Systems," IS 2000 version 1.0 Revision D, Feb. 2004 (2 of 6).

3GPP2 C.S0001-D, "Introduction to cdma2000 Spread Spectrum Systems," IS 2000 version 1.0 Revision D, Feb. 2004 (3 of 6).

3GPP2 C.S0001-D, "Introduction to cdma2000 Spread Spectrum Systems," IS 2000 version 1.0 Revision D, Feb. 2004 (4 of 6).

3GPP2 C.S0001-D, "Introduction to cdma2000 Spread Spectrum Systems," IS 2000 version 1.0 Revision D, Feb. 2004 (5 of 6).

3GPP2 C.S0001-D, "Introduction to cdma2000 Spread Spectrum Systems," IS 2000 version 1.0 Revision D, Feb. 2004 (6 of 6).

3GPP2 C.S0024; "cdma2000 High Rate Packet Data Air Interface Specification," 3GPP2 C.S0024 version 2.0, IS-856, Oct. 27, 2000.

TIA-95-B; "Mobile Station-Base Station Compatibility Standard for Wideband Spread Spectrum Cellular Systems," Sep. 2004.

Bender P, et al., CDMA/HDR: a bandwidth efficient high speed wireless data service for nomadic users, Communication Magazine, the US., IEEE, Jul. 2000, vol. 38, pp. 70-77.

Qualcomm Europe, "Further details on HS-SCCH-less operation for VoIP traffic", 3GPP TSG-RAN WG2 meeting #51 R2-060550, Feb. 13, URL,http://www.3gpp.org/ftp/tsg_ran/WG2_RL2/TSGR2_51/Documents/R2-060550.zip.

Taiwan Search Report—TW096130642—TIPO—Nov. 27, 2011.

* cited by examiner

METHOD AND APPARATUS FOR LOW-OVERHEAD PACKET DATA TRANSMISSION AND CONTROL OF RECEPTION MODE

CLAIM OF PRIORITY UNDER 35 U.S.C. §119

The present Application for patent claims priority to Provisional Application No. 60/838,586, entitled "METHOD AND APPARATUS FOR LOW-OVERHEAD PACKET DATA TRANSMISSION AND CONTROL OF DRX" filed Aug. 17, 2006, and assigned to the assignee hereof and hereby expressly incorporated by reference herein.

CLAIM OF PRIORITY UNDER 35 U.S.C. §120

The present Application for patent is a Continuation in Part and claims priority to patent application Ser. No. 11/553,446, entitled "EFFICIENT TRANSMISSION ON A SHARED DATA CHANNEL FOR WIRELESS COMMUNICATION" filed Oct. 26, 2006, which claims priority to Provisional Application No. 60/732,418, entitled "HSDPA ENHANCEMENTS FOR REAL-TIME SERVICES," filed Oct. 31, 2005, both of which are assigned to the assignee hereof and hereby expressly incorporated by reference herein.

BACKGROUND

1. Field

The present disclosed aspects relates generally to communications, and more specifically to method and apparatus for low-overhead packet data transmission and control of reception mode.

2. Background

A wireless multiple-access communication system may include many Node Bs (or base stations) that support communication for many user equipments (UEs). A Node B may communicate with multiple UEs on the downlink and uplink. The downlink (or forward link) refers to the communication link from the Node Bs to the UEs, and the uplink (or reverse link) refers to the communication link from the UEs to the Node Bs.

On the downlink, a Node B may transmit data to multiple UEs using dedicated data channels and/or a shared data channel. A dedicated data channel is a data channel that is assigned to a specific UE and is used to send data only to that UE. A shared data channel is a data channel that is shared by multiple UEs and can carry data for one or more UEs at any given moment. A data channel is a mechanism for sending data and may be dependent on the radio technology used by the system. For example, in a Code Division Multiple Access (CDMA) system, a data channel may be associated with a specific channelization code, e.g., a specific Walsh code.

A Node B may use a shared data channel to achieve various benefits. The shared data channel may allow for better utilization of the available radio resources since each UE may be served as needed and using just enough radio resources to serve that UE. The shared data channel may also support higher peak data rates for the UEs since all radio resources available for the shared data channel may potentially be used for one UE. The shared data channel may also provide flexibility in scheduling the UEs for data transmission on the downlink.

A Node B may send signaling on a shared control channel in parallel with the shared data channel to convey how the shared data channel is used. For example, the signaling may convey which UE(s) are being served, the radio resources allocated to each UE being served, how data is sent to each UE, etc. Because of the dynamic nature of the shared data channel, the UEs that can potentially receive data on the shared data channel may continuously monitor the shared control channel in order to determine whether data is being sent for them. Each UE that receives signaling on the shared control channel may process the shared data channel based on the received signaling to recover the data sent to the UE. However, the shared control channel represents overhead for the shared data channel.

There is therefore a need in the art for reducing the shared channel overhead.

SUMMARY

Aspects disclosed herein address the above stated needs by providing a system that eliminates the transmission of control channel signaling for new transmissions and only transmits control channel signaling for retransmissions. Also, a discontinuous reception mode is created for the UE so that it can be powered down at predetermined intervals.

Techniques for efficient data transmission and reception in a wireless communication system are described herein. According to an aspect, a method for wireless communications includes receiving a control packet including information related to a previously transmitted data packet; receiving a retransmission data packet, wherein the previously transmitted data packet and the retransmission data packet are derived from common data; and obtaining the common data based on the information related to the previously transmitted data packet, wherein the previously transmitted data packet and the retransmission data packet are associated with a series of data packets including a first data packet and wherein the first data packet does not have a control packet transmitted therewith.

According to another aspect, a method for wireless communications includes transmitting a control packet having information related to a previously transmitted packet, the information not having been transmitted when the previously transmitted packet was transmitted; and transmitting a data packet, wherein the previously transmitted packet and the second packet are derived from common data.

According to yet another aspect, a user equipment includes means for receiving a control packet including information related to a previously transmitted data packet; means for receiving a retransmission data packet, wherein the previously transmitted data packet and the retransmission data packet are derived from common data; and means for obtaining the common data based on the information related to the previously transmitted data packet, wherein the previously transmitted data packet and the retransmission data packet are associated with a sequence of data packets including a first data packet and wherein the first data packet does not have a control packet associated therewith.

According to yet another aspect, a computer-program product for wireless communications includes a machine-readable medium having instructions executable by a controller to receive a retransmission data packet, wherein the previously transmitted data packet and the retransmission data packet are derived from common data; and obtain the common data based on the information related to the previously transmitted data packet, wherein the previously transmitted data packet and the retransmission data packet are associated with a sequence of data packets including a first data packet and wherein the first data packet does not have a control packet associated therewith.

According to yet another aspect, a user equipment including a demodulator, wherein the demodulator is configured to receive a control packet having information related to a previously transmitted data packet; a retransmission data packet, wherein the previously transmitted data packet and the retransmission data packet are derived from common data; a reception data processor coupled to the demodulator, wherein the reception data processor is configured to obtain the common data based on the information related to the previously transmitted data packet, wherein the previously transmitted data packet and the retransmission data packet are associated with a sequence of data packets including a first data packet and wherein the first data packet does not have a control packet associated therewith; and a transducer coupled to the reception data processor, wherein the transducer is configured to produce audio based on the common data.

According to yet another aspect, a method for wireless communications includes transmitting a control packet having information related to a previously transmitted data packet, the information not having been transmitted when the previously transmitted packet was transmitted; and transmitting a retransmission data packet, wherein the previously transmitted data packet and the retransmission data packet are derived from common data.

According to yet another aspect, an apparatus for wireless communications includes means for transmitting a control packet having information related to a previously transmitted data packet, the information not having been transmitted when the previously transmitted packet was transmitted; and means for transmitting a retransmission data packet, wherein the previously transmitted data packet and the retransmission data packet are derived from common data.

According to yet another aspect, an apparatus for wireless communications includes a transmitter, the transmitter configured to transmit a control packet having information related to a previously transmitted data packet, the information not having been transmitted when the previously transmitted packet was transmitted; and to transmit a retransmission data packet, wherein the previously transmitted data packet and the retransmission data packet are derived from common data.

According to yet another aspect, a computer-program product for wireless communications includes a machine-readable medium having instructions executable by a controller to transmit a control packet having information related to a previously transmitted data packet, the information not having been transmitted when the previously transmitted packet was transmitted; and transmit a retransmission data packet, wherein the previously transmitted data packet and the retransmission data packet are derived from common data.

According to yet another aspect, a node B includes an antenna and a transmitter coupled to the antenna, wherein the transmitter is configured to transmit a control packet with the antenna having information related to a previously transmitted data packet, the information not having been transmitted when the previously transmitted packet was transmitted; and to transmit a retransmission data packet with the antenna, wherein the previously transmitted data packet and the retransmission data packet are derived from common data.

DETAILED DESCRIPTION

Various aspects of the disclosure are described below. For convenience, one or more aspects of the disclosure may be referred to herein simply as "an aspect," "aspects," or "some aspects." It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1:
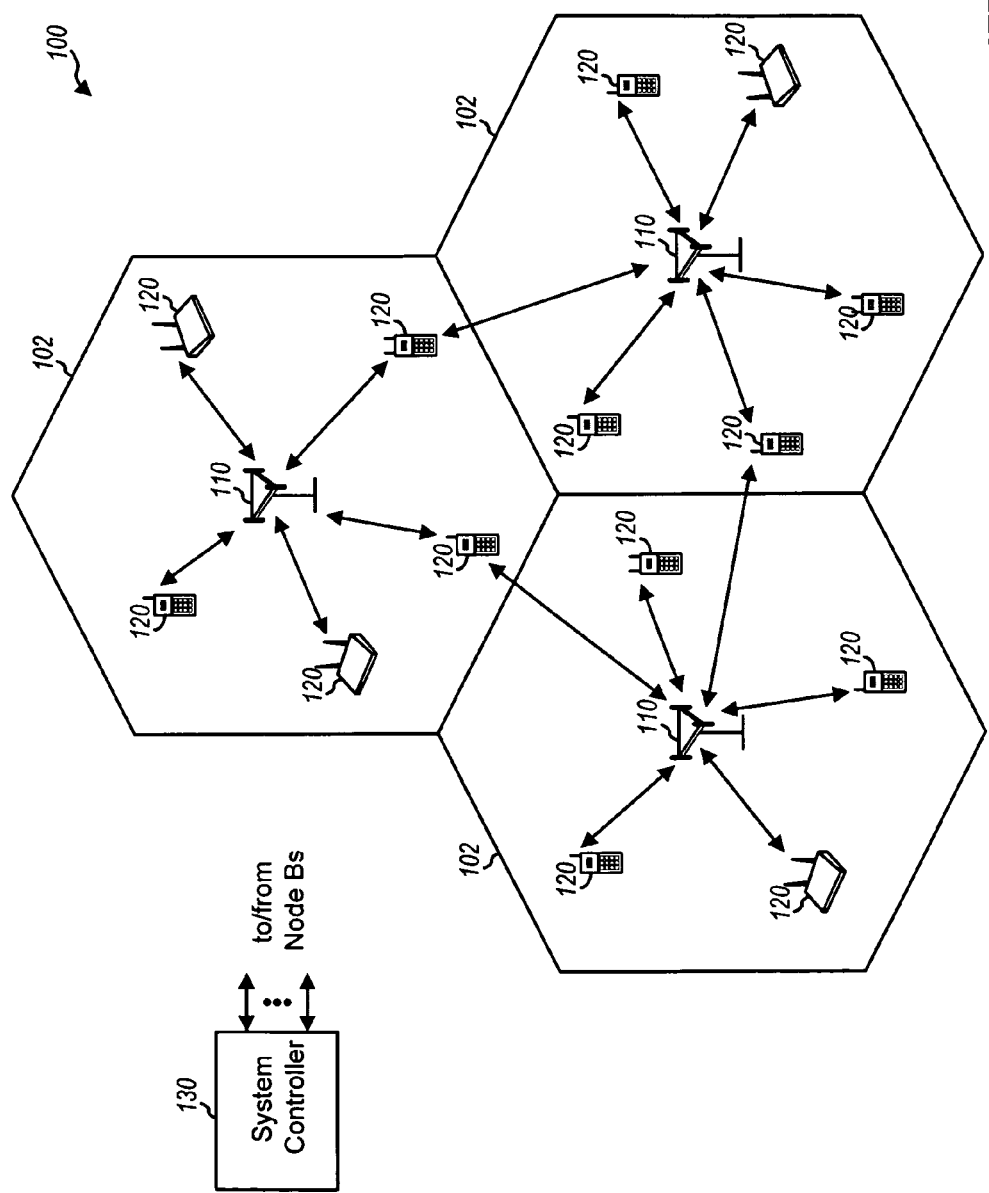
FIG. 1 is a network diagram of a wireless communication system.

FIG. 1 shows a wireless communication system 100 with multiple Node Bs 110 and multiple UEs 120. A Node B is generally a fixed station that communicates with the UEs and may also be referred to as a base station, an enhanced Node B (eNode B), an access point, etc. Each Node B 110 provides communication coverage for a particular geographic area and supports communication for the UEs located within the coverage area. A system controller 130 couples to Node Bs 110 and provides coordination and control for these Node Bs. System controller 130 may be a single network entity or a collection of network entities. For example, system controller 130 may comprise a Radio Network Controller (RNC), a Mobile Switching Center (MSC), etc.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless communication device, a handheld device, a wireless modem, a laptop computer, and so on. A UE may actively communicate with a Node B or may only receive pilot and signaling from the Node B. The terms "UE" and "user" are used interchangeably herein.

Figure 2:
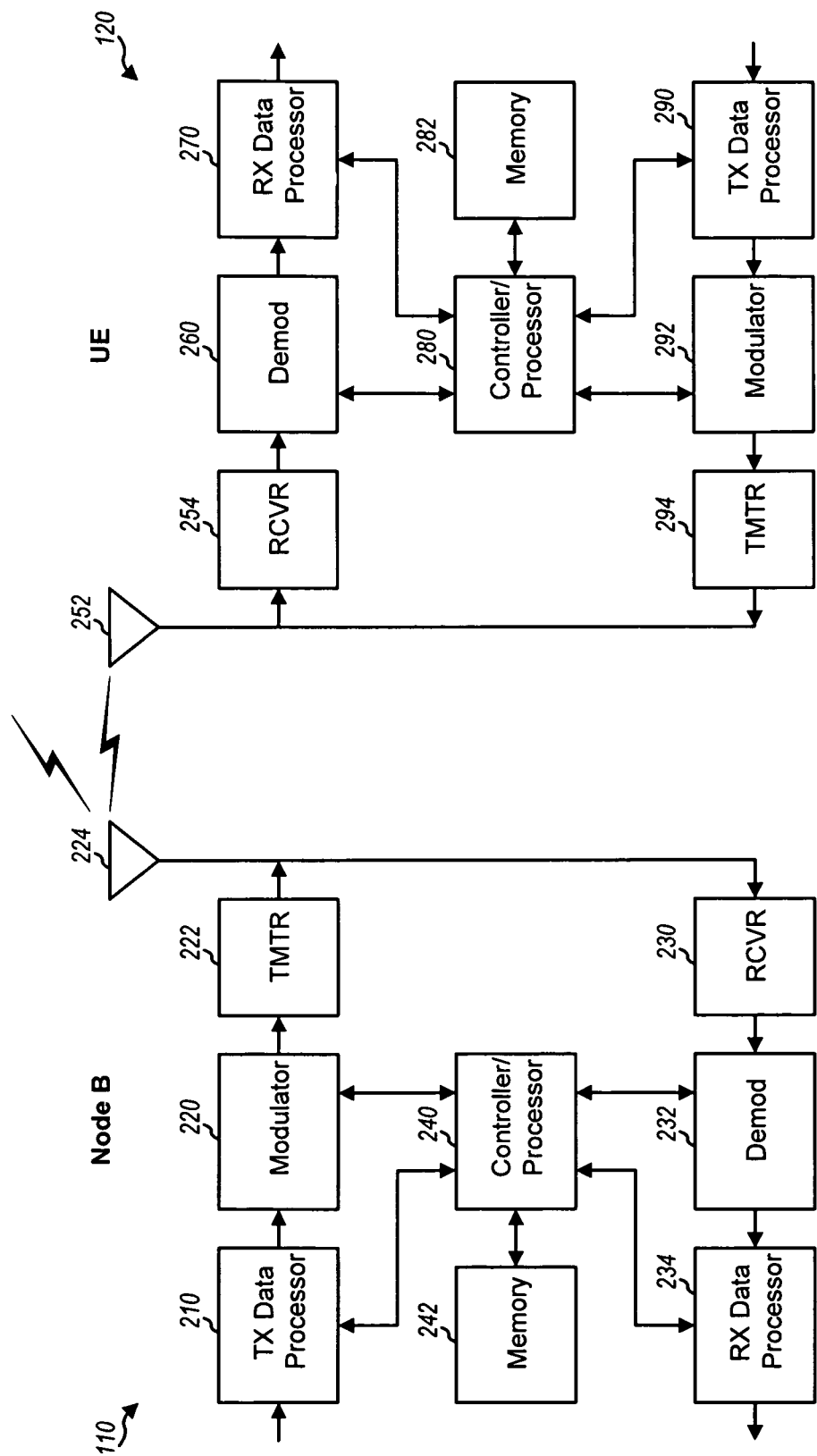
FIG. 2 is a block diagram of a Node B and a UE.

FIG. 2 shows a block diagram of a Node B 110 and a UE 120, which are one of the Node Bs and one of the UEs in FIG. 1. At Node B 110, a transmit (TX) data processor 210 receives traffic data from a data source (not shown) and signaling from a controller/processor 240, processes (e.g., formats, encodes, interleaves, and symbol maps) the traffic data and signaling, and provides data symbols and signaling symbols. A modulator 220 processes the data and signaling symbols as specified by the system and provides output chips. A transmitter (TMTR) 222 processes (e.g., converts to analog, amplifies, filters, and frequency upconverts) the output chips and generates a downlink signal, which is transmitted from an antenna 224.

At UE 120, an antenna 252 receives the downlink signal from Node B 110 and provides a received signal to a receiver (RCVR) 254. Receiver 254 conditions (e.g., filters, amplifies, frequency downconverts, and digitizes) the received signal and provides received samples. A demodulator (Demod) 260 processes the received samples in a manner complementary to the processing by modulator 220 and provides symbol estimates. A receive (RX) data processor 270 processes (e.g., symbol demaps, deinterleaves, and decodes) the symbol estimates and provides decoded data for UE 110.

On the uplink, at UE 120, data and signaling are processed by a TX data processor 290, modulated by a modulator 292, conditioned by a transmitter 294, and transmitted via antenna 252. At Node B 110, the uplink signals from UE 120 and other UEs are received by antenna 224, conditioned by a receiver 230, demodulated by a demodulator 232, and processed by an RX data processor 234 to recover data and signaling sent by the UEs. In general, the processing for uplink transmission may be similar to, or different from, the processing for downlink transmission.

Controllers 240 and 280 direct the operations at Node B 110 and UE 120, respectively. Memories 242 and 282 store data and program codes for Node B 110 and UE 120, respectively.

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, etc. The terms "system" and "network" are often used interchangeably. A CDMA system may utilize a radio technology such as Wideband-CDMA (W-CDMA), cdma2000, etc. cdma2000 covers IS-2000, IS-856, and IS-95 standards. A TDMA system may utilize a radio technology such as Global System for Mobile Communications (GSM). These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). For clarity, the techniques are described below for downlink transmission in a W-CDMA system. However, it should be noted that techniques described herein could be implemented in compliance with other standards such as Institute of Electrical and Electronics Engineers 802.11, 802.16 (WiMAX), and 802.20.

In W-CDMA, data for a UE is processed as one or more transport channels at a higher layer. The transport channels may carry data for one or more services, e.g., voice, video, packet data, gaming, etc. The transport channels are mapped to physical channels at a physical layer. The physical channels are channelized with different channelization codes and are orthogonal to one another in code domain.

3GPP Release 5 and later supports High-Speed Downlink Packet Access (HSDPA), which is a set of channels and procedures that enable high-speed packet data transmission on the downlink. For HSDPA, a Node B sends data on a High Speed Downlink Shared Channel (HS-DSCH), which is a downlink transport channel that is shared by all UEs in both time and code. The HS-DSCH may carry data for one or more UEs in a given transmission time interval (TTI). A TTI is equal to one subframe for HSDPA and is the smallest unit of time in which the UEs may be scheduled and served. The sharing of the HS-DSCH is dynamic and may change from TTI to TTI.

Table 1 lists some downlink and uplink physical channels used for HSDPA and provides a short description for each physical channel.

TABLE 1

| Link | Channel | Channel Name | Description |
| --- | --- | --- | --- |
| Downlink | HS-PDSCH | High Speed Physical Downlink Shared Channel | Carry data sent on the HS-DSCH for different UEs. |
| Downlink | HS-SCCH | Shared Control Channel for HS-DSCH | Carry signaling for the HS-PDSCH. |
| Uplink | HS-DPCCH | Dedicated Physical Control Channel for HS-DSCH | Carry feedback for downlink transmission in HSDPA. |

For HSDPA, a Node B may use up to fifteen 16-chip channelization codes with spreading factor of 16 (SF=16) for the HS-PDSCH. The Node B may also use any number of 128-chip channelization codes with spreading factor of 128 (SF=128) for the HS-SCCH. The number of 16-chip channelization codes for the HS-PDSCH and the number of 128-chip channelization codes for the HS-SCCH are configurable. The channelization codes for the HS-PDSCH and HS-SCCH are orthogonal variable spreading factor (OVSF) codes that may be generated in a structured manner. The spreading factor (SF) is the length of a channelization code. A symbol is spread with a channelization code of length SF to generate SF chips for the symbol.

A UE may be assigned up to fifteen 16-chip channelization codes for the HS-PDSCH and up to four 128-chip channelization codes for the HS-SCCH. The channelization codes for the HS-SCCH are assigned to the UE at call setup and signaled to the UE via upper layer signaling. The channelization codes for the HS-PDSCH are assigned dynamically and conveyed to the UE via signaling sent on the HS-SCCH using one of the assigned 128-chip channelization codes.

HSDPA may also be considered as having (a) up to fifteen HS-PDSCHs, with each HS-PDSCH using a different 16-chip channelization code, and (b) any number of HS-SCCHs, with each HS-SCCH using a different 128-chip channelization code. In this case, a UE may be assigned up to four HS-SCCHs and up to fifteen HS-PDSCHs. In the following description, HSDPA is considered as having (a) a single HS-PDSCH with up to fifteen 16-chip channelization codes and (b) a single HS-SCCH with any number of 128-chip channelization codes. In the following description, references to channelization codes are for the HS-PDSCH unless noted otherwise.

Figure 3:
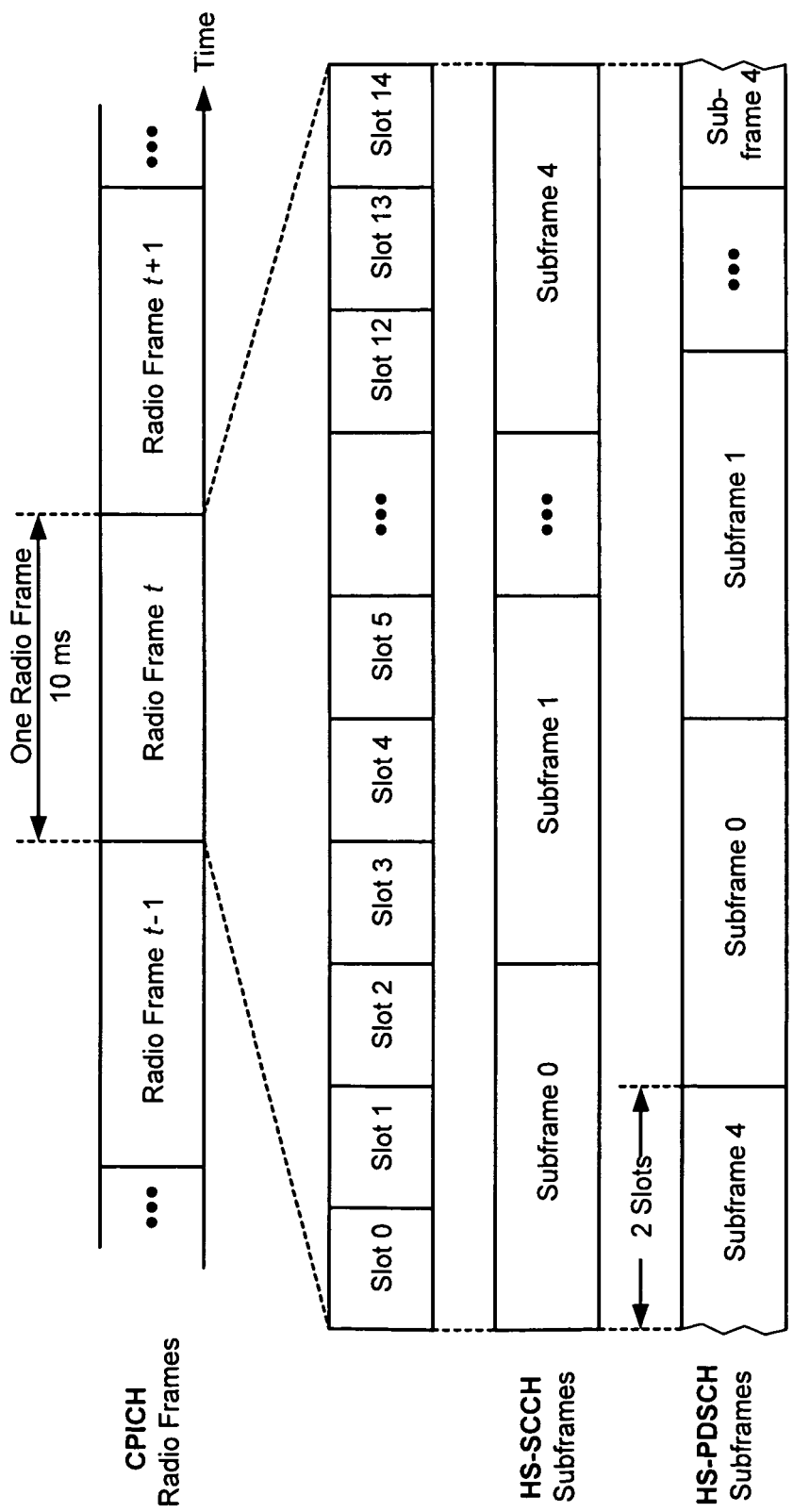
FIG. 3 is a frame format in W-CDMA.

FIG. 3 shows a frame format in W-CDMA. The timeline for transmission is divided into radio frames. The radio frames on the downlink are defined relative to the timing of a Common Pilot Channel (CPICH). Each radio frame has a duration of 10 milliseconds (ms) and is identified by a 12-bit system frame number (SFN). Each radio frame is further partitioned into 15 slots, which are labeled as slot 0 through slot 14. Each slot has a duration of 0.667 ms and includes 2560 chips at 3.84 megachips/second (Mcps). Each radio frame is also partitioned into five subframes 0 through 4. Each subframe has a duration of 2 ms and spans 3 slots. The subframes of the HS-SCCH are time aligned with the radio frames of the CPICH. The subframes of the HS-PDSCH are shifted to the right (or delayed) by two slots relative to the subframes of the HS-SCCH.

The HS-DSCH carries transport blocks for the UEs being served. A transport block is a block of data and may also be referred to as a data block, a packet, etc. Each transport block is encoded and modulated and then sent on the HS-PDSCH.

HSDPA supports hybrid automatic retransmission (HARQ), which is also referred to as incremental redundancy (IR). With HARQ, a Node B sends a new transmission for a transport block and may send one or more retransmissions until the transport block is decoded correctly by a UE, or the maximum number of retransmissions has been sent, or some other termination condition is encountered. The Node B may thus send a variable number of transmissions for a transport block. The first transmission is referred to as a new transmission, and each subsequent transmission is referred to as a retransmission. HSDPA supports asynchronous IR, which means that a retransmission may be sent a variable amount of time after a prior transmission. In contrast, with synchronous IR, a retransmission is sent a fixed amount of time after a prior transmission. With both synchronous and asynchronous IR, there is a time gap between successive transmissions of a transport block. During this time gap, transmissions for other transport blocks may occur. Transmissions of different transport blocks may therefore be interleaved with HARQ.

For HARQ in HSDPA, a Node B generates a cyclic redundancy check (CRC) for a transport block, appends the CRC to the transport block, and encodes the transport block and CRC based on a coding scheme or code rate to obtain a coded block. The CRC is used by a UE to detect errors after decoding. The Node B partitions the coded block into multiple redundancy versions. Each redundancy version may contain different encoded information (or code bits) for the transport block. The Node B may send one redundancy version for each transmission of the transport block. In HSDPA, the Node B may select the sequence of redundancy versions to send for the transport block.

The use of HS-SCCH signaling provides control information for all new transmissions and retransmissions. However, the control messages sent by the HS-SCCH signaling constitute overhead because they consume HS-SCCH codes (which are limited in number) as well as some power. To reduce the overhead by the use of HS-SCCH, it would be desirable to eliminate HS-SCCH signaling. In an aspect, the HS-SCCH signaling is eliminated for all new transmissions on the HS-PDSCH, and only used for retransmissions. The following description will first describe how transmissions using HS-SCCH is achieved for background purposes, and then describe how transmissions without HS-SCCH, also referred to as HS-SCCH-less transmissions, are achieved.

Where control signaling is used for each transmission on the HS-PDSCH, the Node B sends signaling on the HS-SCCH for each transmission sent on the HS-PDSCH. Table 2 gives the signaling sent on the HS-SCCH. The first column of Table 2 lists different fields or types of information included in the signaling, the second column gives the size of each field, and the third column gives a short description of what is conveyed by each field. The fourth and fifth columns, which describes the signaling when the HS-SCCH is sent (i.e., for all retransmissions) in the HS-SCCH-less transmission approach, are described below.

TABLE 2

HS-SCCH Information

| HS-SCCH Field | Size (bits) | With HS-SCCH | Size (bits) | Without HS-SCCH |
|---|---|---|---|---|
| Channelization code set | 7 | Indicate one of 120 possible channelization code sets for HS-PDSCH | 7 | One channelization code assigned to the UE prior to transmissions on HS-PDSCH. |
| Modulation scheme | 1 | Indicate either QPSK or 16-QAM | 1 | Fixed at QPSK. |
| Special Information | N/A | N/A | 6 | Set to "111110" to indicate HS-SCCH-less operation. |
| Transport-block size | 6 | Used to select one of 254 possible transport block sizes | 2 | Four transport block sizes assigned to the UE; blindly determined by the UE for the transmission of a new packet. |
| HARQ process number | 3 | Indicate which transport block is being sent | 3 | Pointer to previous transmission. |
| Redundancy version (RV) | 3 | Indicate redundancy version and modulation | N/A | Not needed because asynchronous IR is used with a fixed sequence of redundancy versions, identified based on the retransmission ID, below. |
| New data indicator | 1 | Indicate whether current transmission is a retransmission of a previously received transmission. | N/A | Not needed because all HS-SCCH signaling are for retransmissions only. |
| Retransmission ID | N/A | N/A | 1 | Identifies whether the current retransmission is the first or second retransmission. |
| Reserved | N/A | N/A | 1 | Reserved. |
| UE identity (UE ID) | 16 | Sent with signaling on HS-SCCH | 16 | Sent with data on HS-PDSCH |

The signaling on the HS-SCCH includes transport format and resource related information (TFRI) and HARQ-related information (or HARQ information). The TFRI includes the channelization code set, modulation scheme, and transport block size. The HARQ information includes the HARQ process number, redundancy version, and new data indicator. The signaling is processed in two parts. Part 1 contains 8 bits for the channelization code set and modulation scheme. Part 2 contains 13 bits for the transport block size and HARQ information. A CRC is calculated over both parts 1 and 2. Part 1 is encoded with a rate ½ convolutional code, scrambled with the UE ID, and sent in the first slot of a subframe. Part 2 and the CRC are encoded with a rate ½ convolutional code and sent in the last two slots of the subframe. This allows the UE to recover the time critical information of part 1 from the HS-SCCH prior to the data transmission on the HS-PDSCH.

Figure 4:
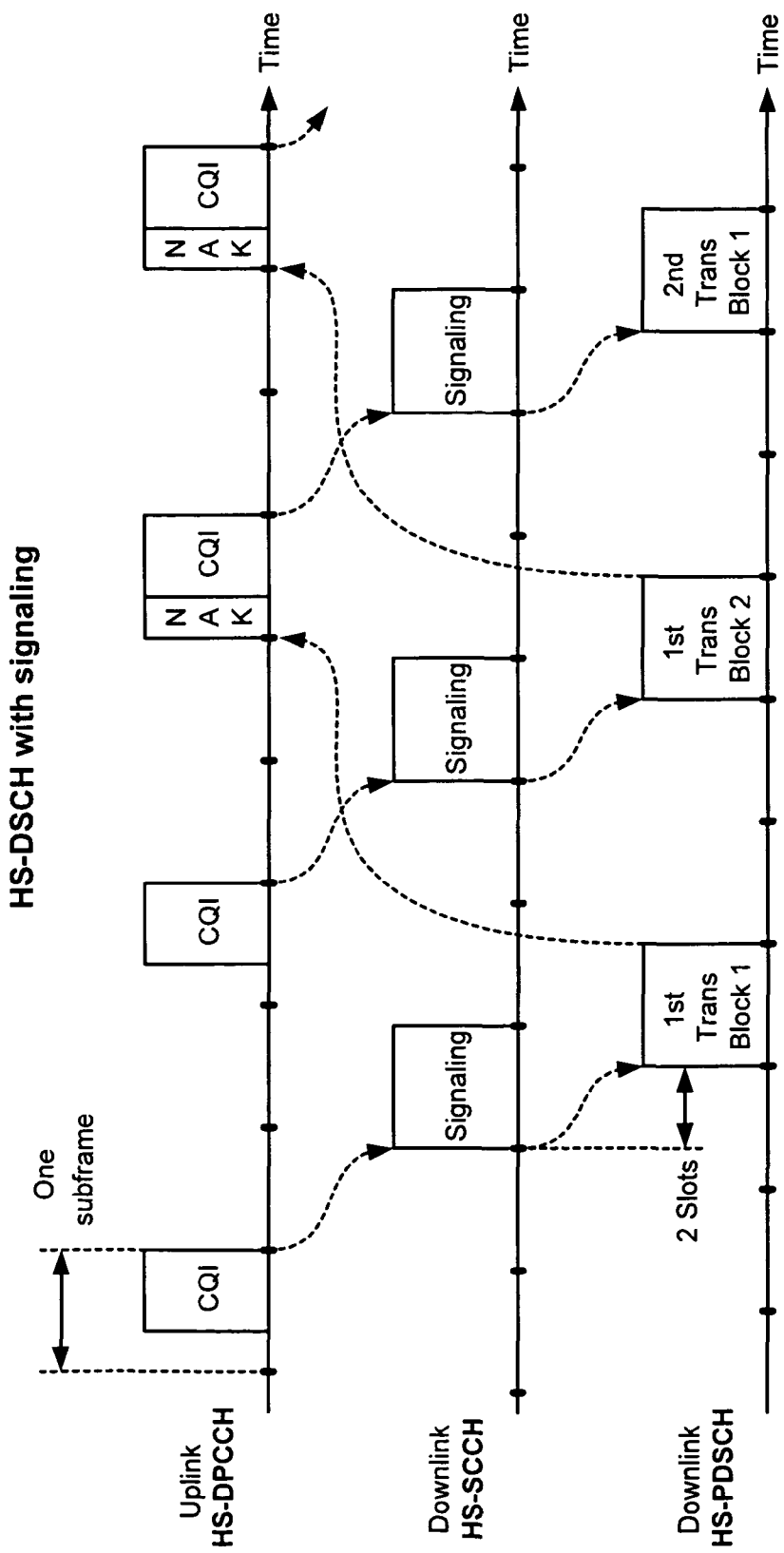
FIG. 4 is a transmissions for a UE with HARQ in HSDPA.

FIG. 4 shows data transmission on the HS-DSCH with signaling. A UE periodically estimates its received signal quality based on a pilot and sends a channel quality indicator (CQI) on the HS-DPCCH. A Node B has data to send to the UE and schedules the UE for downlink transmission. The Node B sends signaling for the UE on the HS-SCCH and sends a first transmission of a transport block for the UE on the HS-PDSCH. The data transmission on the HS-PDSCH is delayed by two slots from the corresponding signaling transmission on the HS-SCCH.

The UE processes the HS-SCCH and recovers the signaling sent to the UE. The UE then processes the HS-PDSCH based on the received signaling and recovers the transport block sent to the UE. The UE sends an acknowledgement (ACK) on the HS-DPCCH if the transport block is decoded correctly and sends a negative acknowledgement (NAK) otherwise. The UE also estimates the received signal quality and sends CQI along with the ACK or NAK on the HS-DPCCH. The feedback transmission on the HS-DPCCH is delayed by approximately 7.5 slots from the end of the corresponding data transmission on the HS-PDSCH.

The Node B may send a retransmission of the transport block if a NAK is received from the UE and may send a new transmission for another transport block if an ACK is received. The Node B sends signaling on the HS-SCCH and the retransmission or new transmission on the HS-PDSCH. The signaling indicates whether the HS-PDSCH carries a retransmission or a new transmission as well as other information. In general, the Node B may send a new transmission for a transport block and one or more retransmissions if necessary. The Node B may send multiple transport blocks in an interlaced manner, as shown in FIG. 4.

Figure 5:
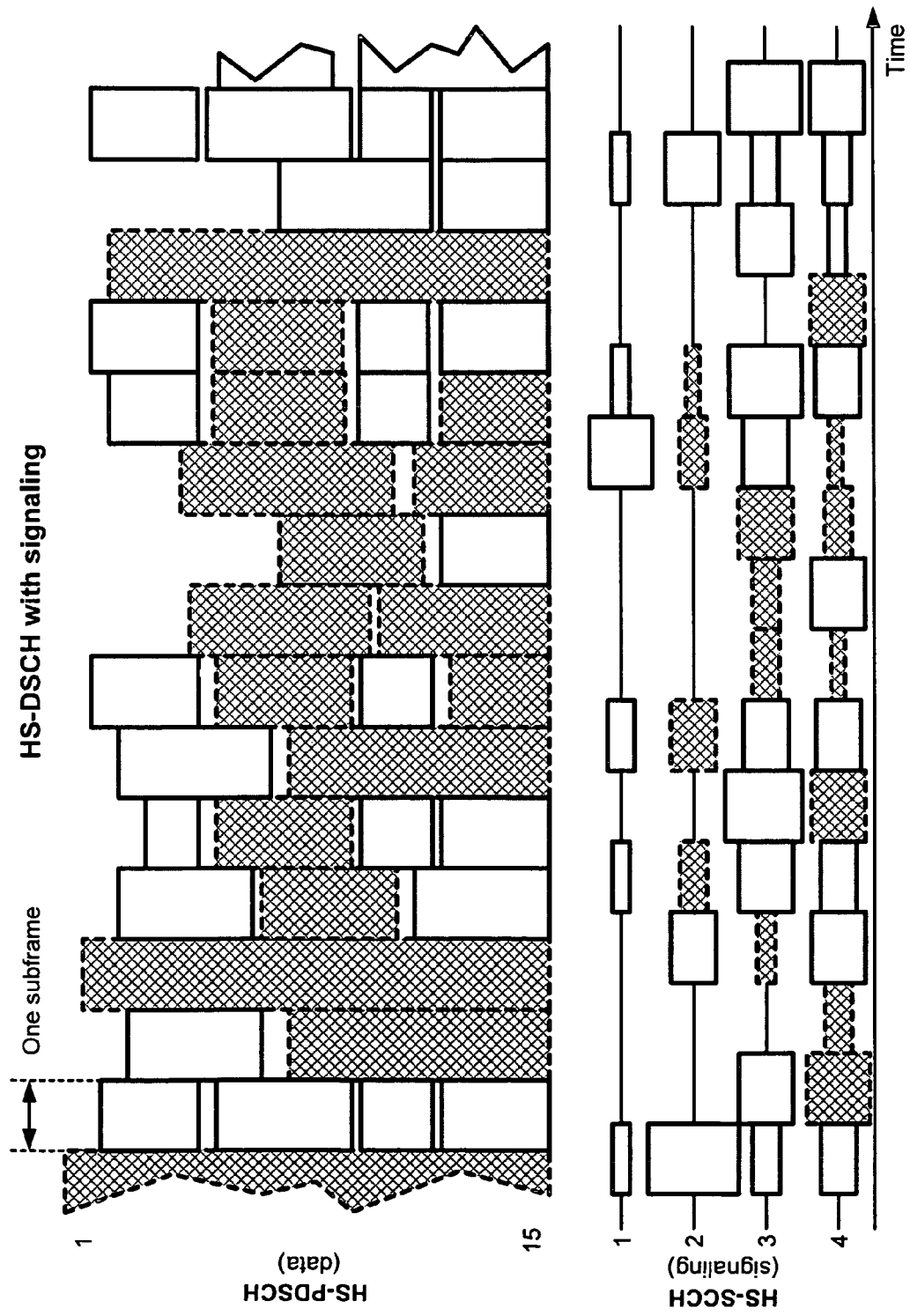
FIG. 5 shows transmissions for multiple UEs in HSDPA.

FIG. 5 shows data transmission to multiple UEs in HSDPA. A Node B schedules UEs for data transmission on the HS-PDSCH in each TTI. The Node B sends signaling for the scheduled UEs on the HS-SCCH and sends transmissions for the scheduled UEs on the HS-PDSCH. Each UE that might receive data on the HS-PDSCH processes the HS-SCCH to determine whether signaling has been sent to that UE. Each scheduled UE processes the HS-PDSCH to recover the transport block sent to the UE. Each scheduled UE sends ACK/NAK and CQI feedback on the HS-DPCCH. UEs that are not scheduled in a given TTI may also send ACK/NAK for a prior transmission and CQI for the current TTI on the HS-DPCCH.

In FIG. 5, transmissions on the HS-PDSCH and signaling on the HS-SCCH for real-time services such as Voice-over-Internet Protocol (VoIP), gaming, etc., are shown with solid shading. Transmissions on the HS-PDSCH and signaling on the HS-SCCH for other services such as best effort, etc., are shown with diagonal hashing. Each transmission on the HS-PDSCH is associated with corresponding signaling on the HS-SCCH.

HSDPA is designed and optimized for applications analogous to downloading large amounts of data. Many simulation results used in the design of HSDPA were generated based on a full-buffer traffic model. This premise leads to an HSDPA design that optimizes cell throughput rather than performance for delay sensitive applications, which may produce relatively small packets. Some of the consequences of the current HSDPA design are:

1. The HS-SCCH carries many bits for signaling, as shown in Table 2,
2. The HS-SCCH is encoded and transmitted in a sub-optimal manner,
3. The HS-PDSCH carries transport blocks that are relatively large for some real-time services, and
4. The HS-DPCCH is continuously transmitted by each UE.

The large amount of signaling on the HS-SCCH is used to support (a) flexible choice of assigned channelization codes for the HS-PDSCH, which can change on a transmission-by-transmission basis, (b) flexible choice of transport block size from 254 possible transport block sizes, (c) flexible choice of transmission and retransmission time for asynchronous IR, (d) flexible choice of redundancy version, and (e) flexible choice of modulation. All of these flexible features result in a large amount of overhead on the HS-SCCH.

Furthermore, the signaling on the HS-SCCH is split into two parts as described above to simplify UE implementation. The HS-PDSCH transmission is delayed relative to the HS-SCCH transmission, as shown in FIGS. 4 and 5, to also simplify UE implementation. Both of these characteristics are sub-optimal and cause the overhead due to the HS-SCCH to be even larger.

The HS-PDSCH can carry transport blocks of different sizes to better match the data payloads of the UEs. HSDPA supports 254 transport block sizes ranging from 137 bits to 27,952 bits. The transport block sizes are dependent on the modulation scheme (e.g., QPSK or 16 QAM) and the number of channelization codes used for transmission on the HS-PDSCH. Different sets of transport block sizes are available for different numbers of channelization codes. For example, 103 transport block sizes ranging from 137 to 1871 bits may be used when one channelization code is assigned for the HS-PDSCH.

The small transport block sizes may utilize too much channelization code space. Spreading factor of 16 is used for the HS-PDSCH because it reduces the amount of signaling to convey the assigned channelization code set while providing sufficient code space granularity for data. This choice of spreading factor results in small transport block sizes (which are seldom used for full-buffer traffic) having small effective code rates. For example, all transport block sizes from 137 to 449 bits with QPSK have a code rate of ½ or less on the first transmission. For VoIP, a full-rate frame for 12.2 kilobits/second (kbps) adaptive multi-rate (AMR) speech contains 317 bits. A typical transport block size for this full-rate frame has a code rate of approximately ⅓ on the first transmission. The excess capacity of this typical transport block size results in a low code rate for the first transmission, which may result in more radio resources being used for the full-rate frame than necessary.

Each UE that might receive data transmission on the HS-PDSCH continuously send feedback information (e.g., CQI) on the HS-DPCCH. The feedback information improves performance of data transmission on the downlink at the expense of uplink overhead and higher UE battery consumption. The flexible scheduling of UEs for data transmission on the HS-PDSCH requires the UEs to continuously monitor the HS-SCCH and continuously transmit on the HS-DPCCH.

For the reasons noted above, the HSDPA design with HS-SCCH signaling provides good performance for applications resembling full-buffer traffic model but is inefficient for applications with low-throughput and/or delay-sensitive data.

Furthermore, this HSDPA design does not consider issues related to continuous packet connectivity, such as uplink overhead and UE battery life.

In an aspect, a Node B sends transmissions on a shared data channel (e.g., the HS-DSCH and HS-PDSCH) to a UE based on at least one parameter that is assigned to the UE prior to the transmissions. The Node B does not send signaling on a shared control channel (e.g., the HS-SCCH) for any new transmissions sent to the UE on the shared data channel (i.e., the Node B only sends HS-SCCH signaling on retransmissions on the shared data channel), which may greatly reduce overhead. The UE processes the transmissions received from the shared data channel based on the assigned parameters. A shared data channel may comprise channels at different layers (e.g., transport and physical channels) observed by a transport block or a data packet. As an example, for HSDPA, a shared data channel may comprise the HS-DSCH and HS-PDSCH. A shared data channel may comprise other channels for other radio technologies.

In general, any number of parameters and any type of parameter may be assigned to the UE. For example, the assigned parameters may include any one or any combination of the following:
  1. Channelization code parameters,
  2. Coding and modulation parameters, and
  3. HARQ or retransmission parameters.

The channelization code parameters may indicate the number of channelization codes and/or the specific channelization codes usable for transmissions to the UE. The assigned channelization codes may be any of the 16-chip channelization codes available for the HS-PDSCH and/or other channelization codes. For example, the UE may be assigned a channelization code with spreading factor of 32 or 64, which may occupy less code space than one 16-chip channelization code. The UE may process the shared data channel for only the assigned channelization codes and may ignore other channelization codes.

The coding and modulation parameters may indicate how data is encoded and modulated. For example, the coding and modulation parameters may indicate one or more modulation schemes (e.g., QPSK and/or 16 QAM), one or more transport block sizes, one or more code rates, etc., usable for transmissions to the UE. The UE may process the shared data channel based on the assigned coding and modulation parameters. In an aspect, only QPSK is used, as shown in Table 2.

The bits previously used for the HARQ parameters in the HS-SCCH mode of operation are repurposed to indicate parameters applicable for retransmissions to the UE such as with which previous transmission/retransmission the current transmission is associated (HS-SCCH-less Pointer). The number of the retransmission for a retransmission transport block (Retransmission ID) is also sent in the retransmission to indicate the previous transmission (if the current retransmission is a retransmission of a new transmission) or retransmission (if the current retransmission is a retransmission of a previous retransmission) with which the current retransmission transport block is associated. The redundancy versions for the transport block for each retransmission may be sent in a specific order that is known a priori by the Node B and UE. For example, a first redundancy version may be sent in a first retransmission for the transport block, a second redundancy version may be sent in a second retransmission, a third redundancy version may be sent in a third retransmission, etc.

In an aspect, if a UE supports the sending of ACK/NAK feedback, such that the ACK/NAK feedback setting may indicate whether to send both ACK and NAK feedback, only ACK feedback, etc., the UE will be set to only ACK feedback in the HS-SCCH-less mode of operation. For new transmissions when no signaling is sent on the HS-SCCH and where the UE encounters a decoding error, the UE may not be able to determine whether the decoding error resulted from (a) a transport block sent to the UE and decoded in error by the UE; (b) a transport block sent for another UE, where the UE is receiving the transport block being sent to another UE because the transport block is being sent over a shared channel (the decoding not being correct because the UE ID with which the transport block was coded was the UE ID of the other UE); or (c) no transport blocks sent to any UE. Therefore, a UE may not know when to send NAKs for its transport blocks. By sending only ACK feedback, extraneous and erroneous signaling for NAKs for such unrelated decoding errors due to transport blocks being sent to other UEs may be avoided.

The assigned parameters may also include other types of parameters, which may be dependent on the system design. For example, in an OFDM-based system, the assigned parameters may indicate one or more specific subcarriers that can be used for transmissions to the UE. In a system that supports multiple-input multiple-output (MIMO) transmission, the assigned parameters may indicate the number of data streams that can be sent to the UE, one or more pre-coding matrices that can be used for transmissions to the UE, etc.

The shared data channel may comprise transport and physical channels, e.g., the HS-DSCH and HS-PDSCH. Certain parameters (e.g., coding parameters) may be applicable for the transport channel portion of the shared data channel while other parameters (e.g., modulation and channelization code parameters) may be applicable for the physical channel portion of the shared data channel.

In an aspect, one or more transmission formats may be defined and assigned to a UE. Each transmission format may be associated with one or more specific parameters to use for transmission. For example, a transmission format may be associated with a specific set of one or more channelization codes, a specific modulation scheme, a specific code rate or transport block size, etc. A Node B may send a transmission based on one of the transmission format(s) assigned to the UE. If the UE is assigned multiple transmission formats, then the Node B may use any one of the transmission formats for each transmission sent to the UE.

In general, a parameter may be for anything pertinent for data transmission such as, e.g., block size, code rate, modulation scheme, HARQ parameter, etc. A transmission format may be associated with one or more specific parameters (e.g., a block size and a modulation scheme) and may be a convenient mechanism for conveying parameters.

Further, in general, assigned parameters may be used for any shared data channel in any wireless communication system. Assigned parameters may be used for HSDPA in order to avoid sending signaling on the HS-SCCH for new transmissions. A new subframe format or transmission mode for the HS-DSCH may be defined with one or more of the following characteristics:
  1. Signaling is not sent on the HS-SCCH for a new transmission and only sent on retransmissions,
  2. One or more specific channelization codes are usable for transmissions to the UE,
  3. One or more specific modulation schemes are usable for transmissions,
  4. One or more specific transport block sizes are usable for transmissions,
  5. HARQ is set to asynchronous IR with a predetermined number of retransmissions, a reference to the previous transmission/retransmission with which the current retransmission is associated, and a predetermined sequence of redundancy versions based on the version of the retransmission (e.g., first retransmission, second retransmission, etc.), and 6. A UE-specific CRC is used for each transport block send on the HS-PDSCH.

Some of the parameters may be fixed while other parameters may be configurable. In an aspect, the channelization codes and transport block sizes are configurable parameters, and other parameters are fixed. For example, the modulation scheme may be fixed at QPSK, the number of retransmissions may be fixed at two, the sequence of redundancy versions may be fixed based on the retransmission version, etc. The fixed parameters are known a priori by the Node B and UE. The configurable parameters may be determined at the start of a call and may be changed during the call.

One or more transmission formats may be defined for a UE. For example, a transmission format may be defined with the following:

1. A specific channelization code for the HS-PDSCH;
2. A specific modulation scheme (e.g., QPSK);
3. A specific transport block size;
4. HARQ-type information set to asynchronous IR, with pointer information to previous transmissions/retransmissions, two retransmissions and a predetermined sequence of redundancy versions; and
5. A UE-specific CRC.

Multiple transmission formats with different parameters may be defined for the UE. For example, two transmission formats may be defined for two different transport block sizes and the same channelization code, modulation scheme, etc. In general, a transmission format may be associated with any number of parameters and any type of parameter.

The parameters that are conveyed via signaling on the HS-SCCH during retransmissions may thus be fixed or configured/assigned prior to transmission. In one design, all of the parameters conveyed via signaling on the HS-SCCH may be handled as shown in the last column of Table 2. In this design, many of the parameters are either fixed or configured/assigned so that signaling on the HS-SCCH is not needed for new transmissions. Further, in this design, a single channelization code and four transport block sizes are usable for transmissions to the UE. The four transport block sizes may be selected based on data requirements for a call. As an example, for a VoIP call, a transport block size of 353 bits may be used for a 12.2 Kbps AMR-NB speech frame or a 12.6 Kbps AMR-WB speech frame. A transport block size of 161 bits may be used for an AMR-NB or AMR-WB silence descriptor (SID) frame. Other transport block sizes and/or different numbers of transport block sizes may also be used.

In an aspect, a UE may be assigned one or multiple channelization codes among the channelization codes available for the HS-PDSCH. In another aspect, a UE may be assigned a channelization code with spreading factor larger than 16. The UE may then de-spread a received transmission with a channelization code that is longer than the shortest channelization code for the shared data channel. The larger spreading factor reduces granularity in code space assignment and may improve channelization code utilization. For example, a UE with small data payload sizes (e.g., for VoIP or gaming) may be assigned a channelization code with spreading factor of 32 and may then occupy half of the code space. A transmission sent with this SF=32 channelization code may have a code rate that is two times higher than a comparable transmission sent with an SF=16 channelization code. HARQ can compensate for the higher code rate by sending retransmissions for transport blocks requiring lower code rates. In yet another aspect, a UE is assigned a time varying channelization code (which may vary over time in a predetermined manner) or different channelization codes in different time intervals.

The assigned parameters for a UE may be given by one or more transmission formats and/or in some other manner. The assigned parameters may be determined for the UE during call setup at the start of a call and may be based on requirements of the call. For example, the assigned transport block sizes may be selected based on data requirements, the assigned time intervals may be selected based on call type (e.g., VoIP or gaming), etc. The assigned parameters may also be modified during the call due to various reasons such as changes in data requirements, system loading, etc. Changes to the assigned parameters may be handled via reconfiguration mechanisms supported by the system. The assigned parameters may thus be static or semi-static and may be configurable for each UE. The assigned parameters may be sent to each UE via upper layer signaling or by some other means prior to transmissions on the shared data channel using the assigned parameters. For example, the assigned parameters may be sent at call setup using Layer 3 Radio Bearer Setup messages in W-CDMA or during reconfiguration using Radio Bearer Reconfiguration messages.

Figure 6:
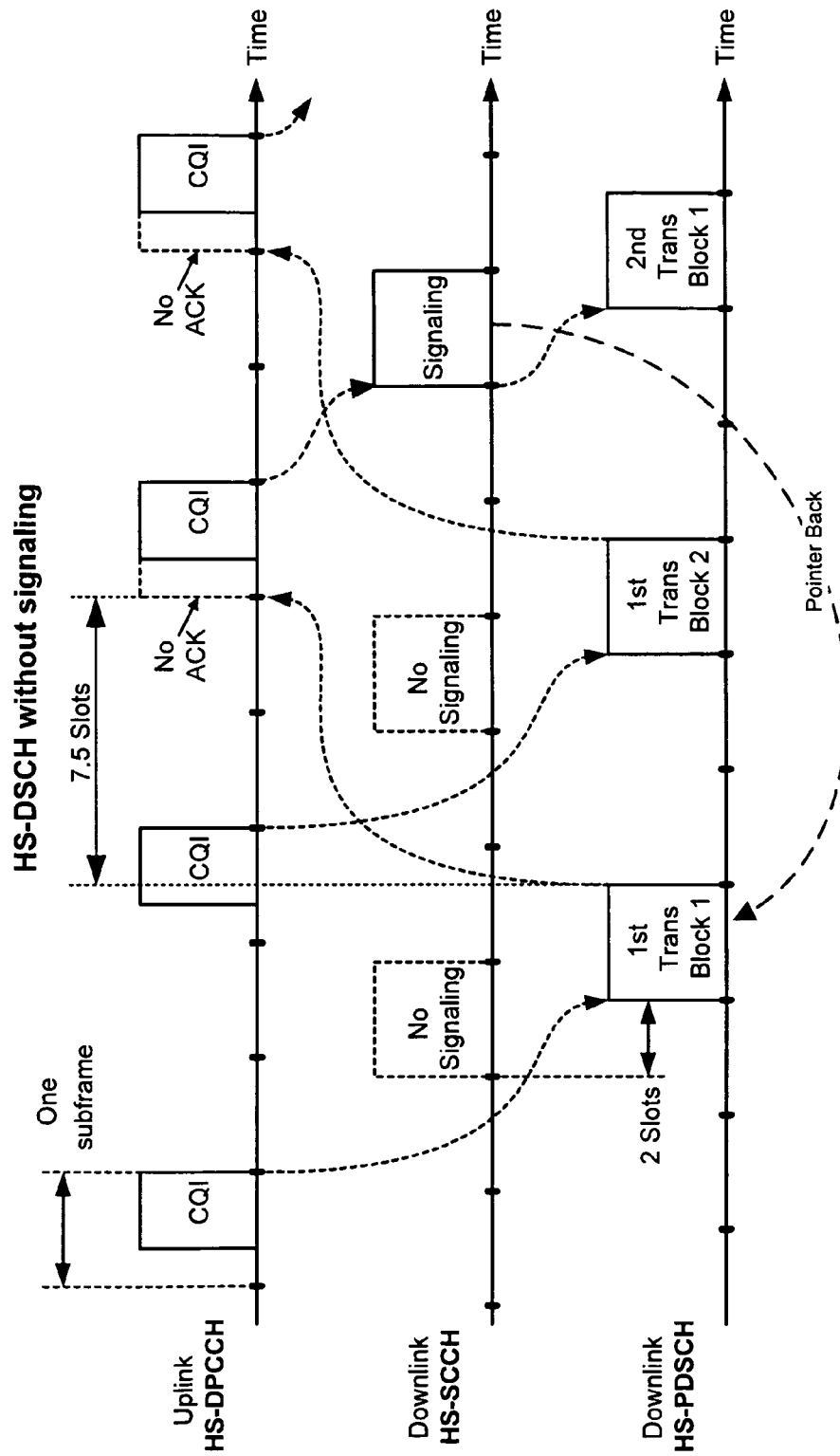
FIG. 6 shows transmissions for a UE with assigned parameters.

FIG. 6 shows data transmission on the HS-DSCH with assigned parameters. A UE periodically estimates its received signal quality and sends CQI on the HS-DPCCH. A Node B has data to send to the UE and schedules the UE for downlink transmission. The Node B processes a transport block based on the assigned parameters, e.g., an assigned transmission format. As this is a first (new) transmission, the Node B sends no signaling on the HS-SCCH and only sends the transmission of the transport block on the HS-PDSCH to the UE. The UE processes the HS-PDSCH based on the assigned parameters and recovers the transport block sent to the UE. The UE sends an ACK on the HS-DPCCH if the transport block is decoded correctly and sends nothing otherwise. The UE also estimates the received signal quality and sends CQI along with the ACK/nothing on the HS-DPCCH. The Node B may send a new transmission for another transport block if an ACK is received. In FIG. 6, the UE does not send an ACK because it did not receive the transport block successfully (e.g., the UE either did not receive the transport block at all or the transport block was not correctly received). In an aspect, the Node B will send a retransmission if no ACK is received from the UE within a predetermined period of time. For example, the Node B will schedule a retransmission if the UE does not send back an ACK. Thus, the Node B sends new transmissions without any signaling on the HS-SCCH but will send retransmissions with signaling on the HS-SCCH as described in Table 2.

Figure 7:
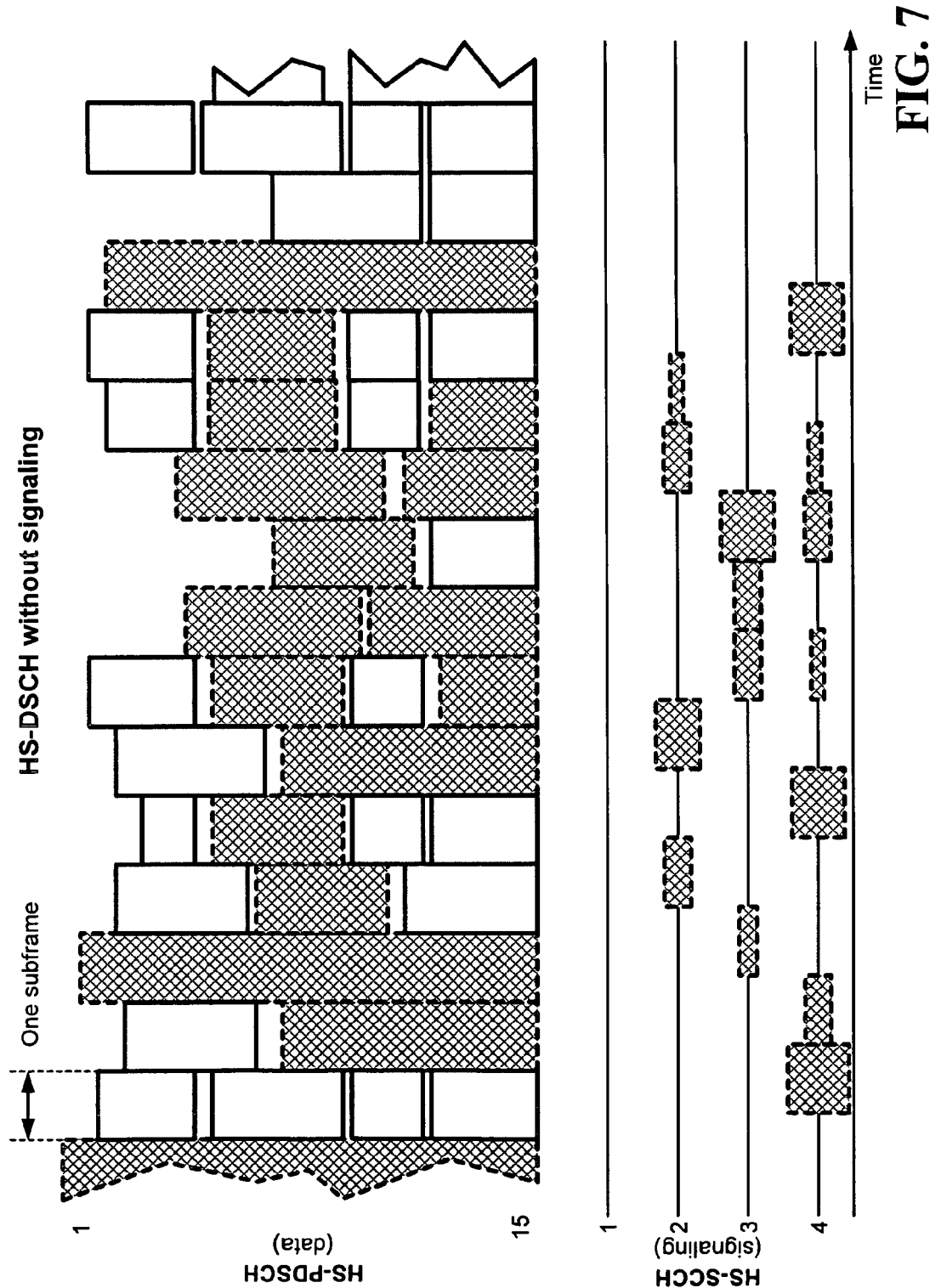
FIG. 7 shows transmissions for multiple UEs with assigned parameters.

FIG. 7 shows data transmission to multiple UEs with assigned parameters. A Node B sends transmissions to UEs with assigned parameters (which are shown with solid shading) as well as transmissions to UEs without assigned parameters (which are shown with diagonal hashing) on the HS-PDSCH. The Node B sends signaling on the HS-SCCH only to the UEs without assigned parameters or for retransmissions to UEs with assigned parameters, which are shown with diagonal hashing. The Node B does not send signaling to the UEs with assigned parameters. As FIGS. 5 and 7 indicate, radio resources may be saved by not sending signaling to the UEs with assigned parameters.

Figure 8:
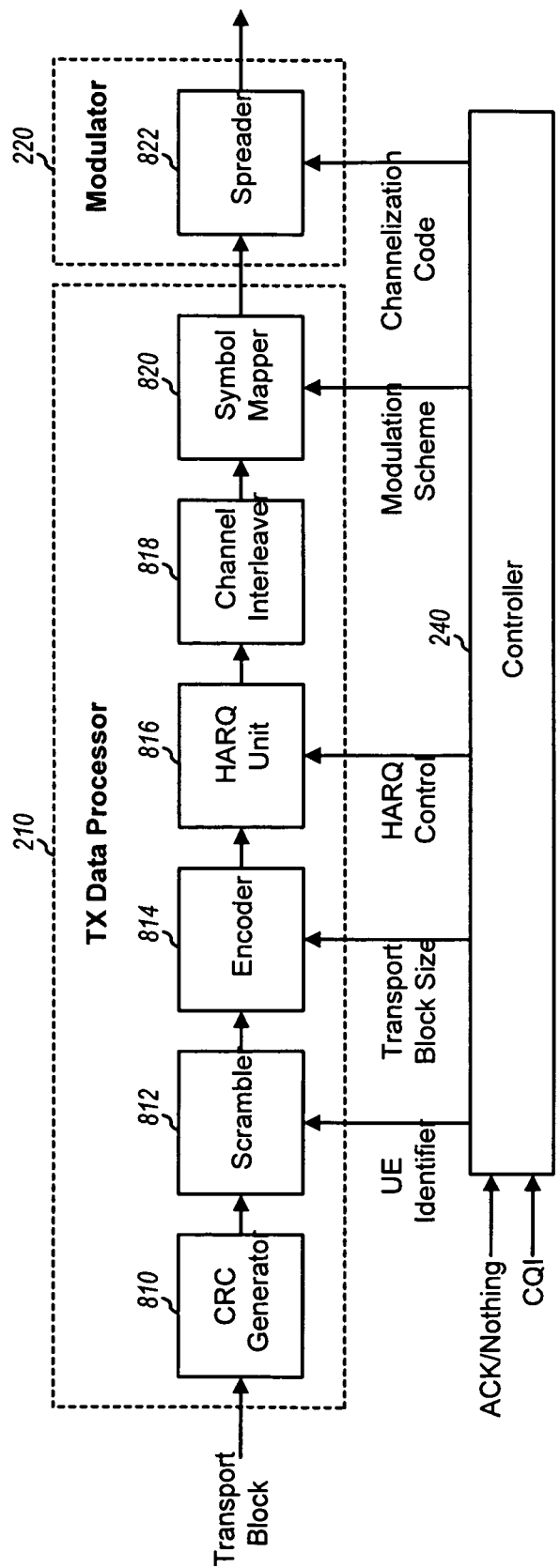
FIG. 8 shows a TX data processor and a modulator at the Node B.

FIG. 8 shows a block diagram of a design of TX data processor 210 and modulator 220 at Node B 110 in FIG. 2. For clarity, FIG. 8 shows processing units to generate a transmission on the HS-PDSCH for one UE.

Within TX data processor 210, a CRC generator 810 generates a CRC for a transport block. A scrambler 812 may scramble the transport block, the CRC, or both the transport block and CRC based on a UE identifier (UE ID) for the recipient UE. This UE ID may be a MAC ID or some other type of ID that can uniquely identify the recipient UE. A UE-specific CRC may be generated in various manners that make this CRC specific for the recipient UE. For example, a CRC may be generated in the normal manner, and the CRC may then be made specific to the UE. This may be achieved by performing an exclusive OR (XOR) operation between the computed CRC and the UE ID. In general, UE-specific scrambling may be performed on all or any portion of a transmission and also anywhere along the transmit processing path.

An encoder 814 encodes the scrambled block based on a coding scheme and provides a coded block having a selected transport block size. Controller 240 may select the transport block size based on the CQI received from the UE, the transport block sizes assigned to the UE, etc. An HARQ unit 816 partitions the coded block into multiple redundancy versions. For each transmission, HARQ unit 816 determines which redundancy version to send based on an HARQ control from controller 240 and provides the selected redundancy version. A channel interleaver 818 interleaves (or reorders) the code bits in the selected redundancy version. A symbol mapper 820 maps the interleaved bits to data symbols based on a modulation scheme selected for the UE. This modulation scheme may be fixed (e.g., to QPSK) when using assigned parameters.

Within modulator 220, a spreader 822 spreads the data symbols based on a channelization code assigned to the UE and provides data chips. The data chips are further processed and transmitted to the UE. Controller/processor 240 may receive feedback (e.g., ACK/nothing, CQI, etc.) from the UE and may provide various parameters (e.g., the UE ID, transport block size, HARQ pointer—the pointer to a previous transmission/retransmission if the current transport block is a retransmission, modulation scheme, channelization code, etc.) for each transmission sent to the UE.

Figure 9:
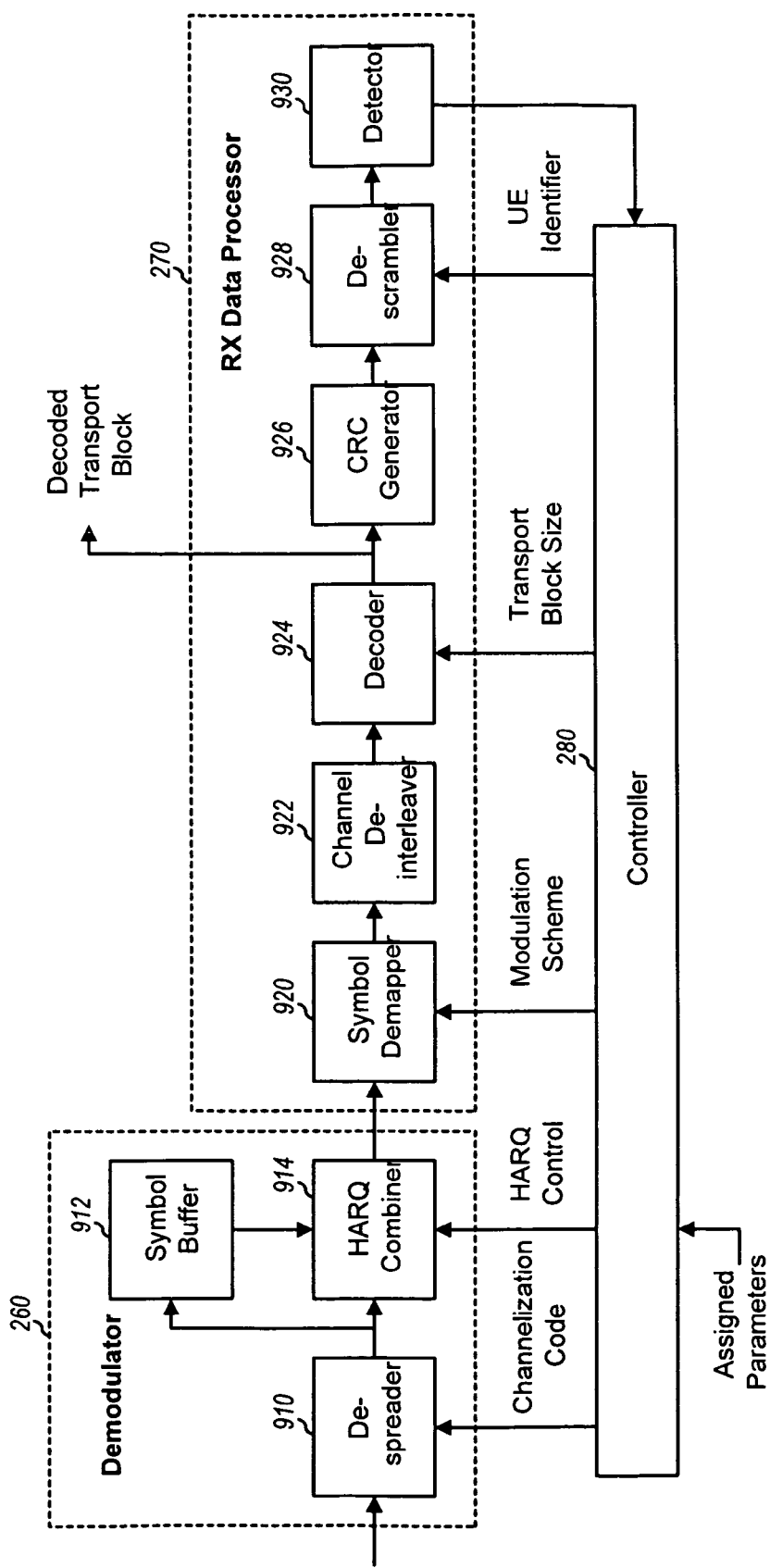
FIG. 9 shows a demodulator and an RX data processor at the UE.

FIG. 9 shows a block diagram of a design of demodulator 260 and RX data processor 270 at UE 120 in FIG. 2. Within demodulator 260, a despreader 910 despreads the received samples for a received transmission based on a channelization code assigned to the UE and provides despread symbols to a symbol buffer 912 and an HARQ combiner 914. Buffer 912 stores the despread symbols for possible combining with future transmissions. HARQ combiner 914 may (a) pass the despread symbols for the current transmission from despreader 910 without combining or (b) combine the despread symbols for the current transmission with despread symbols for one or more prior transmissions based on an HARQ control from controller 280.

Within RX data processor 270, a symbol demapper 920 demaps the despread symbols from HARQ combiner 914 based on the selected modulation scheme. For example, symbol demapper 920 may provide log-likelihood ratios (LLRs) for code bits of the despread symbols. A channel de-interleaver 922 performs de-interleaving in a manner complementary to the interleaving performed by channel interleaver 818 in FIG. 8. A decoder 924 decodes the output of de-interleaver 922 based on a transport block size and provides a decoded transport block.

If the Node B scrambles the CRC for the transport block, then a CRC generator 926 generates a CRC for the decoded transport block, and a descrambler 928 descrambles a received CRC, as shown in FIG. 9. If the Node B scrambles the transport block, then descrambler 928 descrambles the decoded transport block, and CRC generator 926 generates a CRC for the descrambled transport block (not shown in FIG. 9). In either case, a detector 930 compares the locally-generated CRC against the received or descrambled CRC and determines whether the transport block is decoded correctly or incorrectly based on the comparison result. In general, the UE-specific descrambling at the UE is performed in a manner complementary to the UE-specific scrambling at the Node B. Controller/processor 280 may provide various parameters (e.g., the channelization code, HARQ pointer—the pointer to a previous transmission/retransmission if the current transport block is a retransmission, modulation scheme, transport block size, UE ID, etc.) for each transmission processed by the UE.

The UE may perform blind decoding for a received transmission based on the assigned parameters. The UE may process the received transmission for each possible hypothesis until the transport block is decoded correctly or all hypotheses have been evaluated. The number of hypotheses is dependent on the unknown factors at the UE. For example, if four transport block sizes can be used for a transmission, then the UE may decode the received transmission for each of the four transport block sizes. If up to two retransmissions can be sent for a transport block and the UE has HARQ pointer information so as to determine the redundancy version, then the UE may process the received transmission for two hypotheses corresponding to the received transmission being a second transmission (i.e., first retransmission), and a third transmission (i.e., second retransmission). In this example, the UE may perform blind decoding for up to four hypotheses covering four possible transport block sizes.

The UE may evaluate the hypotheses in a sequential order that may be selected based on the likelihood of occurrence for each hypothesis. For example, the UE may perform decoding for the transport block size that is most likely, then decoding for the next most likely transport block size, etc. For example, if the UE is assigned four transport block sizes and the larger transport block size is used more often than the smaller transport block size, then the UE may perform decoding for the larger transport block size first before performing decoding for the smaller transport block size.

Figure 10:
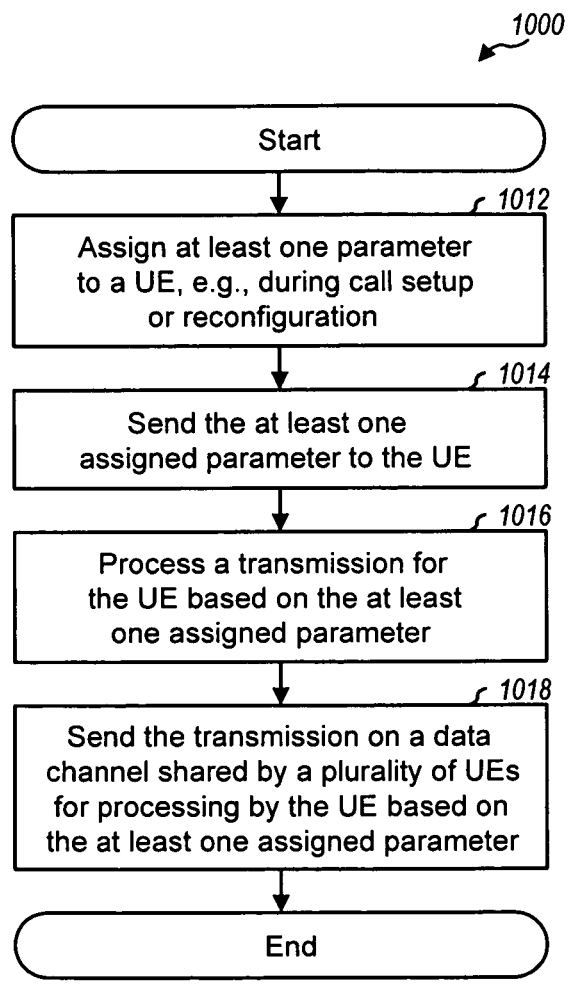
FIG. 10 shows a process for data transmission without signaling.

FIG. 10 shows a process 1000 performed by a Node B for data transmission without HS-SCCH signaling in a first transmission of a transport block. The Node B assigns at least one parameter to a UE (block 1012). The at least one parameter may comprise at least one of a channelization code, a block size, a modulation scheme, a transmission format, a retransmission parameter, etc. For example, the at least one parameter may comprise multiple transmission formats (e.g., multiple transport block sizes) usable for transmissions to the UE. The at least one parameter may be assigned during call setup at the start of a call to set up radio bearers for the UE, during reconfiguration to change radio bearers for the UE, etc. The Node B sends the at least one assigned parameter to the UE (block 1014). The Node B thereafter processes a transmission for the UE based on the at least one assigned parameter (block 1016). The Node B may scramble all or a portion of the transmission with an identifier for the UE. The Node B sends the transmission on a data channel shared by a plurality of UEs for processing by the UE based on the at least one assigned parameter (block 1018). The Node B will send the transmission without HS-SCCH signaling if this is a first transmission, and with HS-SCCH signaling if this is a retransmission. Thus, the Node B may disable transmission of downlink control information/signaling corresponding to the transmission of new transport blocks on the shared data channel.

Figure 11:
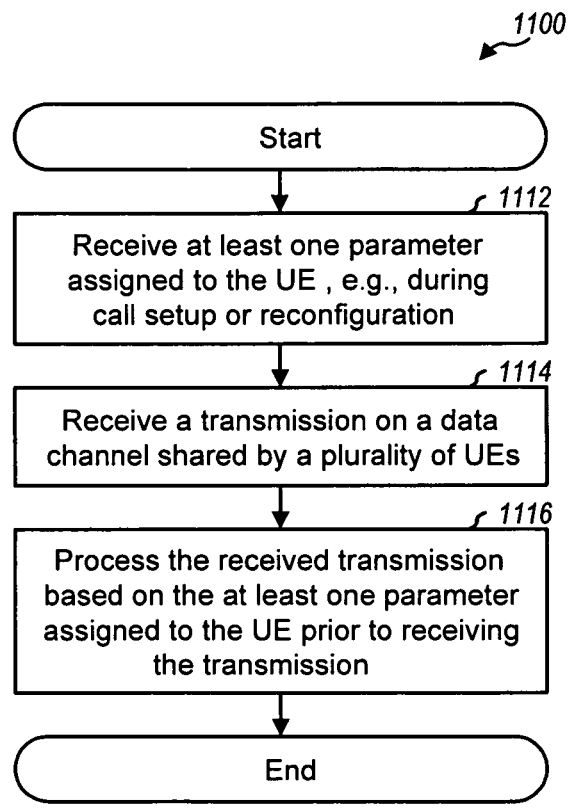
FIG. 11 shows a process for data reception without signaling.

FIG. 11 shows a process 1100 performed by a UE for data reception without HS-SCCH signaling on the transmission of new transport blocks. The UE receives at least one parameter assigned to the UE, e.g., during call setup, reconfiguration, etc. (block 1112). The at least one parameter may comprise any of the parameters listed above. The UE thereafter receives a transmission on a data channel shared by a plurality of UEs (block 1114). The UE processes the received transmission based on the at least one parameter assigned to the UE prior to receiving the transmission (block 1116). The received transmission may comprise one or more packets of data (or transport blocks).

The processing by the UE in block 1116 may include processing/decoding the received transmission based on different transmission formats (e.g., different transport block sizes) usable for the received transmission. The UE may select one transmission format at a time, process the received transmission based on the selected transmission format, terminate the processing of the received transmission if it is decoded correctly, and repeat the processing for another transmission format if it is not decoded correctly.

If HARQ is used, then the UE may determine whether the received transmission is a new transmission or a retransmission because of the received HS-SCCH, e.g., based on decoding result for a prior transmission, and a prior transmission, the number of retransmissions allowed, etc. The UE may first process the received transmission as a new transmission to obtain a decoded packet and, if the decoded packet is in error, process the received transmission as a retransmission. Alternatively, the UE may first process the received transmission as a retransmission to obtain a decoded packet and, if the decoded packet is in error, process the received transmission as a new transmission. In both cases, the UE may process the received transmission for different hypotheses corresponding to different numbers of transmissions sent prior to the received transmission, different transport block sizes, etc.

The processing in block 1116 may also include determining if the UE is an intended recipient of the received transmission. This determination may be achieved by checking the received transmission with an identifier for the UE, e.g., generating a CRC for the received transmission, descrambling a received CRC with the UE identifier, and comparing the descrambled CRC and the locally-generated CRC. This determination may also be achieved by descrambling the received transmission with the UE identifier.

Figure 12:
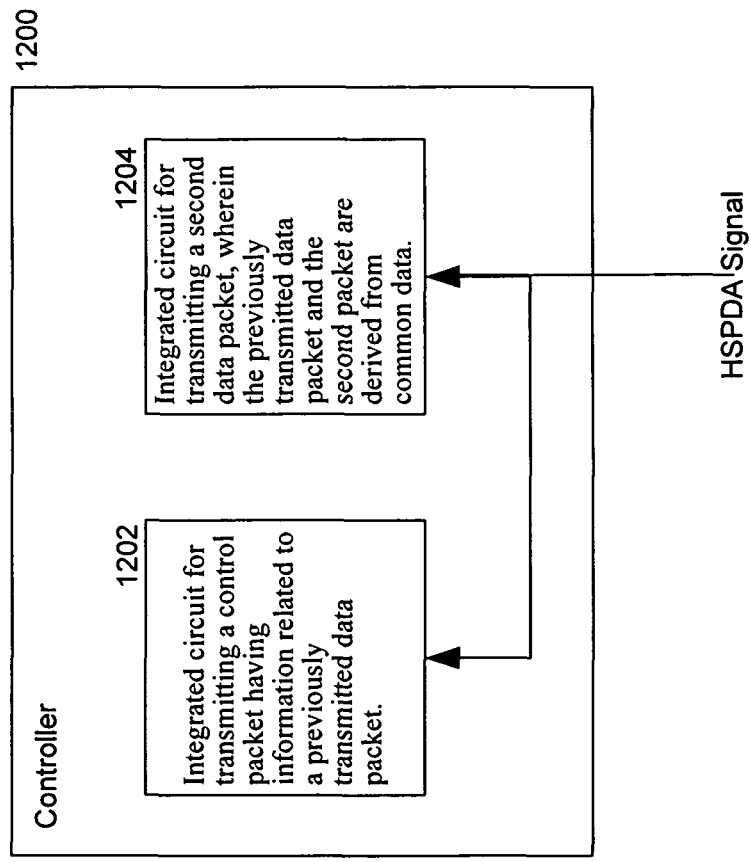
FIG. 12 shows a controller for implementing the data transmission without signaling on a Node B; and,
FIG. 13 shows a controller for implementing the data reception without signaling on a UE.

FIG. 12 is a block diagram of a controller 1200 that is usable to implement the techniques described herein on a Node B. The controller 1200 includes an integrated circuit 1202 for transmitting a control packet having information related to a previously transmitted data packet, the information not having been transmitted when the previously transmitted packet was transmitted; and an integrated circuit 1204 for transmitting a second data packet, wherein the previously transmitted data packet and the second packet are derived from common data.

Figure 13:
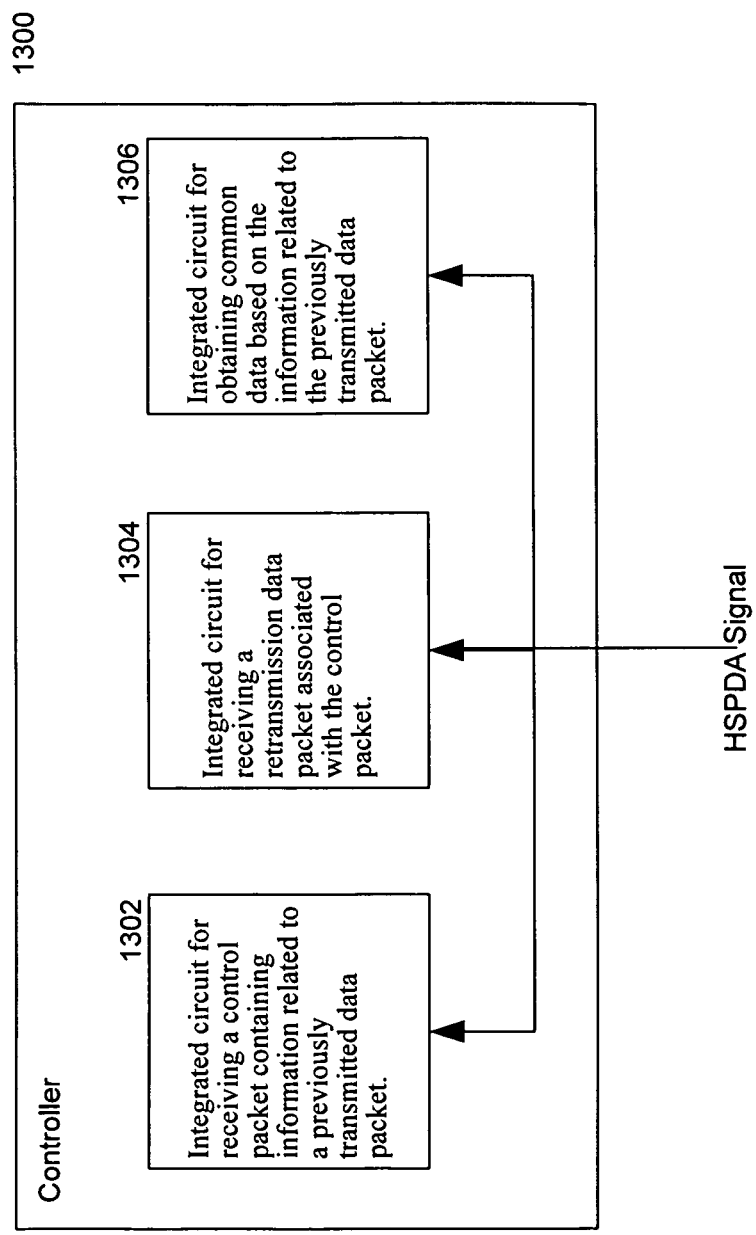

FIG. 13 is a block diagram of a controller 1300 that is usable to implement the techniques described herein on a UE. The controller 1300 includes an integrated circuit 1302 for receiving a control packet, the control packet includes information related to a previously transmitted data packet; an integrated circuit 1304 for receiving a retransmission data packet, wherein the previously transmitted data packet and the retransmission data packet are derived from common data; and an integrated circuit 1306 for obtaining the common data based on the information related to the previously transmitted data packet, wherein the previously transmitted data packet and the retransmission data packet are associated with a sequence of data packets, the sequence of data packets including a first data packet. The first data packet does not have a control packet associated therewith.

The UE may receive additional transmissions on the shared data channel and may process each additional received transmission in similar manner based on the at least one parameter assigned to the UE. The UE may discontinuously receive transmissions on the shared data channel, referred to as the Discontinuous Transmission (DTX) or Reception (DRX). The discussion herein will refer to DRX, but the discussion applies reciprocally to DTX as well.

The DRX operation has a shortcoming of reducing the maximum data rate that can be offered to a given user, as well as reducing the overall downlink capacity for delay sensitive services. The maximum data rate is reduced because the Node B can now only transmit sporadically to a given UE. For example, if the UE is sleeping 3 time intervals out of 4, then the maximum sustained data rate that can be served to the UE is ¼ of what it was when DRX was not used. This may be acceptable when little data is being transmitted (for example, when a user is reading a web page), but will become limiting when the user clicks on a link and requests the download of a new web page. Another drawback of DRX is that it decreases the overall downlink capacity for delay sensitive applications.

In an aspect, the DRX and DTX modes on the UE is toggled through the transmission of a control sequence in the HS-SCCH signal, the HS-SCCH signaling having the form of Table 3, where an escape sequence of bits signals to the UE that a command for the toggling is being issued. Referring to Table 3, below, in one implementation the escape sequence is set to a predefined sequence of "11100000," which is the eight bits of the channelization code set and the modulation scheme; the transport-block size information is also set to a predefined sequence of "111101;" the order type is set to the predefined sequences of "000" for signaling to the UE that a DRX/DTX mode control signal is being issued; and two bits are used to toggle the DRX/DTX modes, respectively. The DRX/DTX Toggling is set to "0" if the mode is to be turned off, or "1" if the mode is to be turned on.

TABLE 3

DTX/DRX Information

| HS-SCCH Field | Size (bits) | Value |
|---|---|---|
| Channelization code set | 7 | 1110000 (Predefined) |
| Modulation scheme | 1 | 0 (Predefined) |
| Transport-block size information | 6 | 111101 (Predefined) |
| Order type | 3 | 000 (DRX/DTX control) |
| Order (DRX toggling) | 1 | 1/0 |
| Order (DTX toggling) | 1 | 1/0 |
| Order (Reserved) | 1 | N/A (Reserved) |
| New data indicator | 1 | N/A (Reserved) |
| UE identity (UE ID)/CRC | 16 | Masked as part of CRC |

In an aspect, the DTX/DRX control information is sent as a physical layer command transmitted in the HS-SCCH signaling, where the order is decoded from the control packet after an escape code is detected in the location of the control packet that is normally used to transmit channelization code set, modulation, and transport-block size information as shown in Table 3, above.

The word "exemplary" is used herein to mean "serving as an example, instance, or illustration." Any aspect described herein as "exemplary" is not necessarily to be construed as preferred or advantageous over other aspects.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal or user equipment (UE). In the alternative, the processor and the storage medium may reside as discrete components in a user terminal. The processor and storage medium can also reside in the Node B in the variety of forms that has been described herein. Further, the steps of a method or algorithm described in connection with the aspects disclosed herein may be embody on a computer program product, which includes computer readable media and its packaging materials.

The sequence of steps of a method or algorithm described in connection with the aspects disclosed herein may be interchanged without departing from the scope of the invention.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the invention. Thus, this disclosure is not intended to be limited to the aspects shown herein but is to be accorded the widest scope consistent with the principles and novel features disclosed herein.

What is claimed is:

1. A method for wireless communications comprising:
   receiving, at a user equipment, a control packet comprising information related to a previously transmitted data packet;
   receiving, at the user equipment, a retransmission data packet, wherein the previously transmitted data packet and the retransmission data packet are derived from common data at a remote device; and
   recovering, at the user equipment, the common data based on the information related to the previously transmitted data packet, wherein the previously transmitted data packet and the retransmission data packet are associated with a sequence of data packets comprising a first data packet and wherein the first data packet does not have a control packet associated therewith.

2. The method of claim 1, wherein the previously transmitted data packet is sent on a transmission medium shared by a plurality of user equipment, and the previously transmitted data packet comprises identification information associated with a particular user equipment.

3. The method of claim 1, further comprising transmitting an acknowledgement message if the complete version of the previously transmitted data packet is retrieved successfully.

4. The method of claim 3, further wherein transmitting the acknowledgement message comprises transmitting an acknowledgement packet in an uplink channel.

5. The method of claim 4, wherein the uplink channel is a High-Speed Downlink Packet Access (HSDPA) uplink channel.

6. The method of claim 1, wherein the information related to the previously transmitted data packet comprises a pointer that identifies a location of the previously transmitted data packet in the sequence of data packets.

7. The method of claim 6, wherein the location of the previously transmitted data packet in the sequence of data packets is a temporal location.

8. The method of claim 6, wherein the pointer comprises an offset of the relative location from the retransmission data packet to identify the previously transmitted data packet.

9. The method of claim 8, wherein the offset comprises a plurality of bits.

10. The method of claim 1, wherein the control packet comprises a slot number.

11. The method of claim 1, wherein the control packet comprises a modulation scheme.

12. The method of claim 1, wherein the retransmission data packet is identical to the previously transmitted data packet.

13. The method of claim 1, wherein the retransmission data packet is of a particular block size, and the control packet further comprises a transport block size that specifies the particular block size of the retransmission data packet.

14. The method of claim 13, wherein the transport block size is chosen from four different possible block sizes.

15. The method of claim 1, wherein the control packet further comprises a retransmission indicator identifying a number of retransmission attempts associated with the retransmission data packet.

16. The method of claim 1, wherein the control packet is transmitted on a High Speed Downlink Shared Control Channel (HS-SCCH) channel.

17. The method of claim 1, further comprising receiving a command for enabling a discontinuous reception (DRX) mode.

18. The method of claim 1, further comprising receiving a command for enabling a discontinuous transmission (DTX) mode.

19. The method of claim 1, further comprising:
receiving at least one parameter assigned to the user equipment; and
processing transmitted data packets based on the at least one parameter.

20. The method of claim 19, wherein the parameter is assigned to the user equipment before the user equipment receives the transmitted data packets.

21. The method of claim 19, wherein the parameter comprises one of a channelization code parameter, a coding and modulation parameter, or a retransmission parameter.

22. An apparatus for wireless communications comprising:
means for receiving a control packet comprising information related to a previously transmitted data packet;
means for receiving a retransmission data packet, wherein the previously transmitted data packet and the retransmission data packet are derived from common data at a remote device; and
means for recovering the common data based on the information related to the previously transmitted data packet, wherein the previously transmitted data packet and the retransmission data packet are associated with a sequence of data packets comprising a first data packet and wherein the first data packet does not have a control packet associated therewith.

23. The apparatus of claim 22, wherein the previously transmitted data packet is sent on a transmission medium shared by a plurality of user equipment, and the previously transmitted data packet comprises identification information associated with a particular user equipment.

24. The apparatus of claim 22, further comprising means for transmitting an acknowledgement message if the complete version of the previously transmitted data packet is retrieved successfully.

25. The apparatus of claim 24, wherein the means for transmitting the acknowledgement message comprises means for transmitting an acknowledgement packet in an uplink channel.

26. The apparatus of claim 25, wherein the uplink channel is a High-Speed Downlink Packet Access (HSDPA) uplink channel.

27. The apparatus of claim 22, wherein the information related to the previously transmitted data packet comprises a pointer that identifies a location of the previously transmitted data packet in the sequence of data packets.

28. The apparatus of claim 27, wherein the location of the previously transmitted data packet in the sequence of data packets is a temporal location.

29. The apparatus of claim 27, wherein the pointer comprises an offset of the relative location from the retransmission data packet to identify the previously transmitted data packet.

30. The apparatus of claim 29, wherein the offset comprises a plurality of bits.

31. The apparatus of claim 22, wherein the control information comprises a slot number.

32. The apparatus of claim 22, wherein the control information comprises a modulation scheme.

33. The apparatus of claim 22, wherein the retransmission data packet is identical to the previously transmitted data packet.

34. The apparatus of claim 22, wherein the retransmission data packet is of a particular block size, and the control packet further comprises a transport block size that specifies the particular block size of the retransmission data packet.

35. The apparatus of claim 34, wherein the transport block size is chosen from four different possible block sizes.

36. The apparatus of claim 22, wherein the control packet further comprises a retransmission indicator identifying a number of retransmission attempts associated with the retransmission data packet.

37. The apparatus of claim 22, wherein the control packet is transmitted on a High Speed Downlink Shared Control Channel (HS-SCCH) channel.

38. The apparatus of claim 22, further comprising means for receiving a command for enabling a discontinuous reception (DRX) mode.

39. The apparatus of claim 22, further comprising means for receiving a command for enabling a discontinuous transmission (DTX) mode.

40. An apparatus for wireless communications comprising:
a demodulator configured to receive a control packet comprising information related to a previously transmitted data packet and to receive a retransmission data packet, wherein the previously transmitted data packet and the retransmission data packet are derived from common data at a remote device; and
a reception data processor coupled to the demodulator, wherein the reception data processor is configured to recover the common data based on the information related to the previously transmitted data packet, wherein the previously transmitted data packet and the retransmission data packet are associated with a sequence of data packets comprising a first data packet and wherein the first data packet does not have a control packet associated therewith.

41. The apparatus of claim 40, wherein the previously transmitted data packet is sent on a transmission medium shared by a plurality of user equipment, and the previously transmitted data packet comprises identification information associated with a particular user equipment.

42. The apparatus of claim 40, further comprising a transmitter configured to transmit an acknowledgement message if the complete version of the previously transmitted data packet is retrieved successfully.

43. The apparatus of claim 42, wherein the transmitter transmits an acknowledgement packet in an uplink channel.

44. The apparatus of claim 43, wherein the uplink channel is a High-Speed Downlink Packet Access (HSDPA) uplink channel.

45. The apparatus of claim 40, wherein the information related to the previously transmitted data packet comprises a pointer that identifies a location of the previously transmitted data packet in the sequence of data packets.

46. The apparatus of claim 45, wherein the location of the previously transmitted data packet in the sequence of data packets is a temporal location.

47. The apparatus of claim 45, wherein the pointer comprises an offset of the relative location from the retransmission data packet to identify the previously transmitted data packet.

48. The apparatus of claim 47, wherein the offset comprises a plurality of bits.

49. The apparatus of claim 40, wherein the control information comprises a slot number.

50. The apparatus of claim 40, wherein the control information comprises a modulation scheme.

51. The apparatus of claim 40, wherein the retransmission data packet is identical to the previously transmitted data packet.

52. The apparatus of claim 40, wherein the retransmission data packet is of a particular block size, and the control packet further comprises a transport block size that specifies the particular block size of the retransmission data packet.

53. The apparatus of claim 52, wherein the transport block size is chosen from four different possible block sizes.

54. The apparatus of claim 40, wherein the control packet further comprises a retransmission indicator identifying a number of retransmission attempts associated with the retransmission data packet.

55. The apparatus of claim 40, wherein the control packet is transmitted on a High Speed Downlink Shared Control Channel (HS-SCCH) channel.

56. The apparatus of claim 40, wherein the demodulator is further configured to receive a command for enabling a discontinuous reception (DRX) mode.

57. The apparatus of claim 40, the demodulator is further configured to receive a command for enabling a discontinuous transmission (DTX) mode.

58. A non-transitory machine-readable medium comprising instructions executable by a controller to:
  receive, at a user equipment, a control packet comprising information related to a previously transmitted data packet;
  receive, at the user equipment, a retransmission data packet, wherein the previously transmitted data packet and the retransmission data packet are derived from common data at a remote device; and
  recover, at the user equipment, the common data based on the information related to the previously transmitted data packet, wherein the previously transmitted data packet and the retransmission data packet are associated with a sequence of data packets comprising a first data packet and wherein the first data packet does not have a control packet associated therewith.

59. A user equipment comprising:
  a demodulator configured to receive a control packet comprising information related to a previously transmitted data packet and a retransmission data packet, wherein the previously transmitted data packet and the retransmission data packet are derived from common data at a remote device;
  a reception data processor coupled to the demodulator, wherein the reception data processor is configured to recover the common data based on the information related to the previously transmitted data packet, wherein the previously transmitted data packet and the retransmission data packet are associated with a sequence of data packets comprising a first data packet and wherein the first data packet does not have a control packet associated therewith; and
  a transducer coupled to the reception data processor, wherein the transducer is configured to produce audio based on the common data.

\* \* \* \* \*